United States Patent
Ghislain et al.

[19]

[11] Patent Number: 5,939,709
[45] Date of Patent: Aug. 17, 1999

[54] SCANNING PROBE OPTICAL MICROSCOPE USING A SOLID IMMERSION LENS

[76] Inventors: Lucien P. Ghislain, 1016 Cliff Dr. #323, Santa Barbara, Calif. 93109; Virgil B. Elings, 4664 Via Clarice, Santa Barbara, Calif. 93111

[21] Appl. No.: 08/878,987

[22] Filed: Jun. 19, 1997

[51] Int. Cl.[6] .............................. G02B 7/02; G02B 21/02; G02B 21/06
[52] U.S. Cl. .................... 250/216; 250/234; 250/227.11; 250/306; 250/307; 359/664
[58] Field of Search .................................... 250/216, 234, 250/306, 307, 235, 227.11, 492.2; 359/356, 389, 664, 824, 555, 368, 510, 514, 646, 661, 822, 823, 819, 382, 383, 391, 392

[56] References Cited

U.S. PATENT DOCUMENTS

| | | |
|---|---|---|
| 3,013,467 | 12/1961 | Minsky . |
| 4,604,520 | 8/1986 | Pohl . |
| 4,681,451 | 7/1987 | Guerra et al. . |
| 4,947,034 | 8/1990 | Wickramasinghe et al. . |
| 5,004,307 | 4/1991 | Kino et al. . |
| 5,018,865 | 5/1991 | Ferrell et al. . |
| 5,121,256 | 6/1992 | Corle et al. ............................ 359/664 |
| 5,125,750 | 6/1992 | Corle et al. . |
| 5,181,080 | 1/1993 | Fanton et al. ........................... 356/381 |
| 5,272,330 | 12/1993 | Betzig et al. . |
| 5,410,151 | 4/1995 | Buckland . |
| 5,485,536 | 1/1996 | Islam . |
| 5,489,774 | 2/1996 | Akamine et al. . |
| 5,497,359 | 3/1996 | Mamin et al. . |
| 5,581,082 | 12/1996 | Hansma et al. . |
| 5,602,820 | 2/1997 | Wickramasinghe et al. . |
| 5,696,372 | 12/1997 | Grober et al. ......................... 250/216 |
| 5,729,393 | 3/1998 | Lee et al. ............................... 359/819 |

OTHER PUBLICATIONS

Mansfield, S. M. et al. "Solid Immersion Microscope," App. Phys. Lett., vol. 57 No. 24 Dec. 1990, p. 2615.
Perkowitz, S. et al. "Optical Characterization in Microelectronics Manufacturing," J. Res. Natl. Inst. Stand. Technol., vol. 99, No. 605, 1994 pp. 605–639 (no month).
Synge, E.A. "A Suggested Method for Extending Microscopic Resolution into the Ultramicroscopic Region," Phil. Mag. vol. 6, 1928, (no month).

*Primary Examiner*—Edward P. Westin
*Assistant Examiner*—John R. Lee
*Attorney, Agent, or Firm*—Larry Baker

[57] ABSTRACT

A scanning probe microscope uses a high refractive index solid immersion lens (SIL) probe to provide optical images with a resolution better than the diffraction limit in air. The SIL probe has a spherical upper surface and a conical (or pyramidal) lower surface with a sharp tip. The SIL reduces the focused spot size because the spherical surface increases the angle of the marginal rays and the high refractive index material shortens the wavelength. The focused spot generates an evanescent wave having an amplitude that decays exponentially with distance from the SIL. The sharp tip on the lower surface reduces the tip-sample contact area and the tip-sample separation so that sample is within the near-field of the SIL probe. The sample perturbs the evanescent wave and a photodetector monitors characteristics of the light. A cantilever carries the SIL probe and a cantilever deflection sensor permits precise control of tip-sample forces and separation. The cantilever deflection sensor operates in a force feedback loop to maintain the tip-sample gap within the near-field as the SIL probe scans over the sample in a raster pattern to generate optical data.

71 Claims, 9 Drawing Sheets

SCANNING PROBE OPTICAL MICROSCOPE USING A SOLID IMMERSION LENS

TECHNICAL FIELD

This invention relates to scanning probe optical microscopes utilizing solid immersion lenses.

BACKGROUND OF THE INVENTION

Many important physical characteristics of samples are best determined by optical imaging. Conventional optical microscopy, however, is limited in its ability to resolve very small objects by the wavelength of the light, and conventional "far-field" optical microscopes reached their limit of resolution more than a century ago. A variety of techniques have since been used to extend the resolution of optical microscopy, including: confocal microscopy; near-field methods using probes with a limiting aperture; photon tunneling; and aperture less methods that monitor light scattering from a sharp tip. Each of these techniques has significant limitations. Existing techniques with resolutions much better than the diffraction limit in air typically suffer from low light levels, fragile probes, and difficulty in distinguishing the optical information from other physical parameters, such as distance from the sample.

Conventional optical microscopes using objective lenses illuminate the specimen with an external light source and use lenses in the far-field to gather and focus the light. The far-field corresponds to a specimen-lens distance of many optical wavelengths. In 1877, Abbé published a fundamental formula:

$$d \approx \frac{\lambda}{2NA} \quad [1]$$

According to Abbé's formula, conventional far-field optical microscopes using objective lenses cannot resolve features with a separation smaller than d, where lambda is the wavelength of light and NA is the numerical aperture of the objective lens. The numerical aperture is determined by:

$$NA = n\sin\Theta \quad [2]$$

Where n is the refractive index of the lens, and theta is the half-angle of the cone of illumination.

In the 1880's, oil immersion objectives reached a numerical aperture of 1.4 allowing light microscopes to resolve two points separated by approximately 0.2 microns (approximately lambda/3 for visible wavelengths). With the exception of very unusual (and most often toxic) immersion fluids, and the use of ultraviolet light, this remains the limit for conventional optical microscopes today.

Confocal Microscopes

The principle of laser scanning confocal microscopy (LSCM) was first taught by Minsky (U.S. Pat. No. 3,013,467) in the 1950's. In this well-known technique, light from a point source illuminates a very small region of a sample, and a point detector detects light from that small area. By limiting the spatial dimension of the detector, images with resolution better than the classical diffraction limit may be obtained. An image of the sample object forms one point at a time by synchronously scanning the light source and the detector, in the same way that a scanned television image is formed one pixel at a time. Confocal microscopy has many advantages over standard optical microscopy. For example, confocal microscopy allows for optical sectioning (i.e., depth discrimination) of translucent specimens and provides images of the surface topography of reflective opaque specimens. In addition, a confocal microscope has a horizontal resolution Ip to 1.4 times that of a conventional microscope, and can screen out fogginess normally observed with standard microscopes used on living specimens.

The prior art also includes confocal microscopes using an incoherent light source and an imaging detector to form a complete image in real-time without having to synchronously scan the light source or detector. This full-field confocal microscope uses a spinning disc with an array of pinholes, called the Nipkow disc, as a spatial filter in place of the point detector. The common attributes of confocal microscopes are the ability to image axial "slices" of a specimen, and slightly improved lateral resolution compared to conventional microscopes using objective lenses.

Near-Field Microscopes

In 1928 Synge suggested that optical microscopy could overcome the diffraction limit of light by abandoning the far-field and instead working in the near-field (E. A. Synge, "A Suggested Method for Extending Microscopic Resolution into the Ultra-Microscopic Region", Phil. Mag. 6 (1928) p. 356–362). The near-field exists in close proximity to the specimen, less than one optical wavelength. Using a tiny aperture and placing that aperture in the near-field of the specimen, optical microscopy can achieve significantly greater resolving power.

A number of different implementations of Synge's idea have since been developed. Pohl (U.S. Pat. No. 4,604,520) suggested coating the tip of a prism-like crystal; a sharply pointed optically transparent body is covered with an opaque layer into which an opening is formed at the apex of the body, the opening having a diameter small compared to the wavelength of the light used. A group at Cornell "taffy-pulled" glass micropipettes down to sub-wavelength diameters and defined the aperture by metallic overcoats. Betzig (U.S. Pat. No. 5,272,330) improved upon the Cornell pulled micropipette by replacing the glass micropipette with a fiber optic cable. Using the fiber optic cable Betzig increased transmission efficiency (optical throughput) by three or foul orders of magnitude.

While Betzig improved efficiency, a fundamental problem remains. Although light will propagate efficiently down a fiber optic cable of standard diameter, the light becomes "choked off" when the diameter is reduced beyond a certain dimension. Light propagates in a waveguide-like fashion in a fiber optic cable of standard diameter, but when the diameter of the inner core is reduced, the propagating mode gives way to an evanescent mode. In the evanescent mode the optical energy is no longer truly propagating and is no longer confined to the fiber optic core, but rather a portion of the energy dissipates in the metallic overcoat or escapes by backreflection up into non-propagating modes of the fiber optic cable. The longer the distance light must travel in this evanescent mode, the more energy that escapes. A fiber probe with an aperture diameter of 1000 Å has an efficiency of roughly $2\times10^{-4}$; a probe with an aperture of 250 Å has an efficiency of roughly $1\times10^{-6}$. The efficiency plummets even further for smaller resolutions. Although extremely small apertures can be produced by pulling, the resulting efficiency is so low that virtually no usable light reaches the aperture and the specimen is not illuminated brightly enough to obtain a useful image.

Further improvements to the fiber probe have been proposed, including Islam (U.S. Pat. No. 5,485,536), and Buckland (U.S. Pat. No. 5,410,151). Rather than draw the optical fiber to a thin point and force the light to travel many wavelengths in a non-propagating, evanescent mode, Islam uses a conical tip with a tip length on the order of a few wavelengths. Buckland proposes the use of mulitmode fiber rather than single mode fiber and control of the rate of the taper of the probe tip to improve efficiency. However, the principle of operation is the same: confine the light with an opaque metallic overcoat and force it through a sub-wavelength aperture, or pinhole.

Near-field fiber probe microscopes have additional limitations. In controlling the tip-sample distance, fiber probe microscopes are limited by the fragile nature of the fiber and require very sensitive control of tip-sample distance or very smooth sample surfaces to avoid damage. The requirement to place the surface to be inspected at a distance from the membrane that is approximately equal to the diameter of the aperture implies the limitation that only objects can be inspected that have a surface flatness significantly better than an optical wavelength. In addition, this kind of near-field microscope is particularly difficult to implement for opaque samples where the fiber probe and the conventional collection optics must share the limited space above the sample surface.

Photon Tunneling Microscopes

The basis of operation of the scanning tunneling optical microscope (STOM), also known under the name photon scanning tunneling microscope (PSTM), is the sample-modulated tunneling of internally reflected photons to a sharply pointed optically transparent tip (Ferrell et al., U.S. Pat. No. 5,018,865). The source of the photons is the evanescent field produced by the total internal reflection (TIR) of a light beam from the sample surface, which essentially provides an exponentially decaying waveform normal to the sample surface. Spatial variations in the evanescent field intensity form the basis for imaging. Photons tunneling from the total internal reflection surface to the tip are guided to a suitable detector that converts the light flux to an electrical signal.

These microscopes use a collimated (not focused) beam traveling incident on the surface at an angle greater than the critical angle. They are limited to transparent samples, which must be optically coupled to the prism using an index-matching gel or oil. The beam illuminates a large area of the sample (typically about 1 mm$^2$). A tapered fiber tip perturbs the evanescent field and some of the light from the sample "leaks" out and gets collected by the fiber tip. A photodetector connected to the fiber monitors the collected light.

This technique is limited by the requirement that samples must be transparent; also, a strong background signal due to the large spot size produces stray light by scattering from dirt and defects in the prism and sample. Mixing between optical properties and surface topography can produce images of very small features, but the demonstrated resolution is comparable to conventional far-field optical microscopes (200 nm, or lambda/3 for visible light). The data depends also on whether moisture becomes trapped between the tip and the surface, complicating the internal reflection. The tips used are fragile and there is no force feedback to control tip-sample forces.

Akamine (U.S. Pat. No. 5,489,774) proposed a photon tunneling probe that replaces the tapered fiber with photosensitive cantilever. A photosensitive region on the lower surface of the lever collects light generated by local disruption of the evanescent field or frustrated total internal reflection (FTR). The sharp tip on the lever is used to locally perturb the evanescent field of the sample surface. The cantilever is patterned with wires to connect the photosensitive region to a photodiode current measurement circuit. In addition, a cantilever deflection sensor 16 provides sensitive force feedback. Akamine has the same limitations as fiber-probe photon tunneling microscopes and also is very sensitive to electrical noise, since the photodetector has an active area much larger than the tip dimensions.

A "full-field" photon tunneling microscope was proposed by J. M. in 1987 Guerra (U.S. Pat. No. 4,681,451). In place of a probe having a sharp tip the microscope uses a thin film transducer in contact with the sample surface over a large area (determined by the diameter of the front face of the objective lens). The microscope measures surface topography using totally internally reflected light. Annular illumination provides high lateral resolution (approximately lambda/4), and the exponential decay of the evanescent wave gives a vertical resolution of 1 nm. Unfortunately samples must be very flat because the maximum vertical range (depth of field) is only lambda/2, and the transducer has a large contact area.

In addition, the microscope proposed by Guerra cannot separate height variations from a change in refractive index. A height variation changes the separation between the transducer and the sample, and a change in refractive index alters the decay length of the evanescent wave. Both effects produce the same optical contrast. Thus it is sometimes necessary to make a replica of the sample using optically isotropic material (having a constant refractive index) to avoid confusion between height and refractive index variations.

Combined Atomic Force and Scanning Energy Microscopes

A variety of combined atomic force (AFM) and scanning energy microscopes have been proposed. When using a near-field technique for optical imaging, the additional information provided by an AFM capability can allow the optical characteristics of the sample to be distinguished from probe height effects. Since a scanning energy microscope typically must have the capability to scan an optical probe over a sample, the incorporation of AFM capability may appear fairly straightforward. Most optical probes are not suited for use as AFM probes, however, and many of the proposed combined microscopes suffer from very low light levels and alignment difficulties.

Hansma (U.S. Pat. No. 5,581,082) describes a Combined Scanning Probe and Scanning Energy Microscope comprising an Atomic Force Microscope (AFM) integrated with a Laser Scanning Confocal Microscope (LSCM). Rather than scan the AFM probe or the laser beam of the LSCM separately, the invention uses a sample scanner to provide AFM and LSCM images simultaneously and in registration.

The focusing element in Hansma is a conventional microscope objective and the lateral optical resolution is the same as conventional LSCM's. The probe of the invention is a conventional AFM tip providing height information. Simultaneous optical and height imaging requires precise alignment to position the LSCM laser spot on the AFM probe tip. The Hansma microscope is designed primarily for transparent samples. On opaque reflecting samples the lateral resolution is lower because a long working distance, and thus lower numerical aperture objective, is required. Thus Hansma discloses an LSCM as the means for focusing energy, which is a distinct and separate element from the AFM, the probe, arranged so as to be closely proximate to the sample surface.

The Hansma microscope provides only the limited improvement in resolution of an LSCM, in contrast to near-field scanning optical microscopes, which can have resolutions much better than the diffraction limit. Also, since Hansma uses an AFM probe that is separate from the optical components, the design has significant potential alignment problems.

An aperture less near-field optical microscope was disclosed by Wickramasinghe (U.S. Pat. No. 5,602,820). The microscope uses a standard AFM tip, with a sharpness on the order of an atomic dimension. A conventional object source to a diffraction light source to a diffraction-limited spot that illuminates the end of the AFM tip. An interferometer monitors scattered light from the tip and the sample. Since there is a strong background signal from the sample and the shank of the AFM tip, it is difficult to detect the scattering from the apex of the tip. Wickramasinghe discloses a dither motion applied to the tip in order to reduce the background signal. The microscope is difficult to implement on opaque, reflecting samples because the objective lens and the AFM cantilever share the space above the sample. Further, the cantilever and the base of the AFM tip obstruct the focused beam.

Solid Immersion Lens Microscopes

A near-field solid immersion optical microscope was proposed by Mansfield and Kino in 1990 (U.S. Pat. No. 5,004,307). The microscope operates in real time using the same principle as the liquid immersion microscope but with the liquid replaced by solid lens of high refractive index material. The microscope is based on a wide-field confocal microscope using an incoherent light source to illuminate a hemispherical solid immersion lens (SIL) placed in direct contact with the sample surface. The light returns to produce an image at the eyepieces or an imaging detector, such as a CCD camera. With a solid lens of refractive index n=2 and 436 nm illumination this microscope could resolve 100 nm lines and spaces, a factor of two improvement in the edge response over a confocal microscope.

The SIL used in the Mansfield and Kino microscope has a spherical surface (top) and a planar (flat, bottom) surface intersecting the center of the sphere. The planar surface must contact the sample over an area at least as large as the desired field of view (typically 50 to 100 $\mu$m). High lateral resolution requires that the gap between planar surface and the sample must be a fraction of a wavelength over the entire field of view. Unfortunately, it is not possible to maintain such a small tip-sample gap over the entire contact area, especially on rough samples. Furthermore, sample tilt and surface contamination (particulates, dust and debris) cause variation in the tip-sample gap over the contact area. As a result, current solid immersion optical microscopes cannot achieve high lateral resolution on most sample surfaces.

The Mansfield and Kino microscope also does not provide a force-feedback loop to control forces between the SIL and the sample. A stiff, massive mount (having a low resonance frequency) carries the SIL. As a result, large tip-sample forces can occur, causing SIL or sample damage.

Solid immersion lenses are also well known in optical data storage systems. Corle (U.S. Pat. No. 5,125,750) and Mamin (U.S. Pat. No. 5,497,359), disclose optical. disk systems using a solid immersion lens. The optical assembly includes an objective lens for reading or writing from an optical medium and a solid immersion lens disposed between the objective lens and the medium, with the SIL having a surface closely spaced from the recording medium. The solid immersion lenses used in data storage systems have large bottom surfaces, however, which are suitable for use only on flat surfaces and are therefore not applicable to microscopy applications. The flat bottom surface of the SIL may form an air bearing with the smooth data storage medium to control the size of the gap between the SIL and the disc surface; there is no force feedback loop to control forces on the SIL due to height variations.

SUMMARY OF THE INVENTION

It is the primary object of the present invention to provide a scanning probe optical microscope that permits optical imaging of both smooth and rough samples at a resolution much better than the diffraction limit in air, with a light efficiency much higher than existing near-field microscopes, and without the fragility and alignment difficulties of existing devices. It is a further object of the invention to provide a combined scanning probe optical microscope and atomic force microscope without the limitations of existing combined designs. It is also an object of the present invention to provide improved methods of illuminating with a very small spot size on both smooth and rough samples, of determining the optical characteristics of very small areas on both smooth and rough samples, and of obtaining optical images of both smooth and rough samples at a resolution much better than the diffraction limit in air.

It is also an object of the present invention to provide a highly-versatile microscope capable of performing a wide range of optical characterizations of samples, including the measurement of height variations utilizing interference techniques.

It is an object of the present invention to permit imaging of both smooth and rough surfaces by use of a sharp tip on the SIL probe to reduce the contact area and allow the probe to come into close proximity with the sample surface. High lateral optical resolution is possible even on rough surfaces and in the presence of contamination (particulates, debris, dust, etc.). Additionally, the sharp tip of the SIL probe allows for relative tilt between the probe and the sample.

It is an object of the present invention to provide sensitive tip-sample control by use of a cantilever to carry the SIL probe and a sensor to monitor cantilever deflection. The sensitive force feedback loop maintains the tip-sample gap necessary for high lateral resolution and a strong optical signal, and prevents damage to the-sharp tip. The cantilever can operate in all modes available to atomic force microscopy (AFM) including contact, non-contact, Tapping mode and Lift mode.

The present invention provides optical characterization with high resolution significantly greater than the diffraction limit in air, with the use of a solid immersion lens (SIL) probe that produces a small focal spot. The SIL probe reduces the spot size by increasing the numerical aperture NA=n sin(theta). Refraction at the spherical surface of the SIL probe increases the angle theta, and the SIL is made of material having a high refractive index, n. In effect, the high refractive index material reduces the wavelength of the light. In addition, the SIL probe dimensions are selected to reduce the spot size by minimizing optical aberrations. Focusing the light on an aplanatic surface of the SIL probe eliminates spherical aberration, and focusing the spot on the optic axis of the SIL probe eliminates off-axis aberrations.

The focused spot size in the present invention may potentially be further reduced in size by spatial filtering the incident beam profile. An annular filter reduces the spot size by increasing the optical power in the marginal rays relative to the axial rays of the converging beam.

The present invention provides high light throughput, a strong optical signal and fast scan rates as the SIL probe has a much higher optical throughput than other near-field scanning probes. The optical throughput of the SIL probe is orders of magnitude greater than typical fiber probes. A SIL probe producing a spot size of about 100 nm transmits about half (50%) of the optical power (and this can be increased by use of antireflection coatings). By comparison, a metal-coated fiber probe with a 100 nm aperture transmits only about $10^{-5}$ (0.001%).

The present invention allows for a wide range of optical characterizations of samples through the use of different SIL probe tip profiles. Sharp tips may be used for obtaining high-resolution images by scanning the probe tip over the sample; broad tips, with a large radius of curvature permit determination of sample height variations through interference techniques.

It is a further object of the present invention to provide a method of separation of optical contrast and height data. A mode of operation of Atomic Force microscopes, known as "Lift" mode (U.S. Pat. Nos. 5,308,974 and 5,418,363), typically takes two scans, the first one to record height data and the second to retrace the scan with a constant tip-sample gap and record information from a second contrast mechanism.

It is a further object of the present invention to provide a maximum vertical range corresponding to at least 10 wavelengths of light, and limited only by the Z-range of the scanner, rather than by an inherent limitation of the microscopy technique.

It is a further object of the present invention to operate in both reflection mode and in transmission mode to accommodate opaque and transparent samples.

It is a further object of the present invention to provide a large field of view, limited by the range of the scanner, not the contact area between the SIL probe and sample, and to provide tip scanning for large samples.

It is an object of the present invention to provide a metallic or dielectric coating on the SIL probe bottom surface to modify and improve the optical contrast and resolution.

Other applications

It is an object of the present invention to provide devices and methods of optical microscopy that are useful in a wide variety of applications. In addition to standard optical inspection, metrology and defect review applications, the invention provides for more sophisticated measurements such as thin film thickness measurements with high lateral resolution using, for example, ellipsometry and beam profile reflectometry (Fanton et al. U.S. Pat. No. 5,181,080). Many contrast mechanisms well known in conventional optical microscopy are available with the SIL probe, including fluorescence, luminescence, polarization, phase. interference and dark-field. The SIL probe 10 also has applications in high spatial resolution spectroscopy, including infrared and FTIR (Fourier transform infra-red), visible, modulation, and Raman Scattering. The small spot of the SIL probe may be important for OBIC (optical beam induced current) measurements on devices such as lasers, photodiode, and other optical materials. Similarly the SIL probe can be used for photolithographic patterning of surfaces and selective photo activation. For a general discussion of the optical characterization of materials see, for example, Perkowitz S. et al. "Optical Characterization in Microelectronics Manufacturing," J. Res. Natl. Inst. Stand. Technol., vol. 99, No. 605, 1994, pp. 605–639.

DESCRIPTION OF THE PREFERRED EMBODIMENT

Physical Structure

Figure 1A:
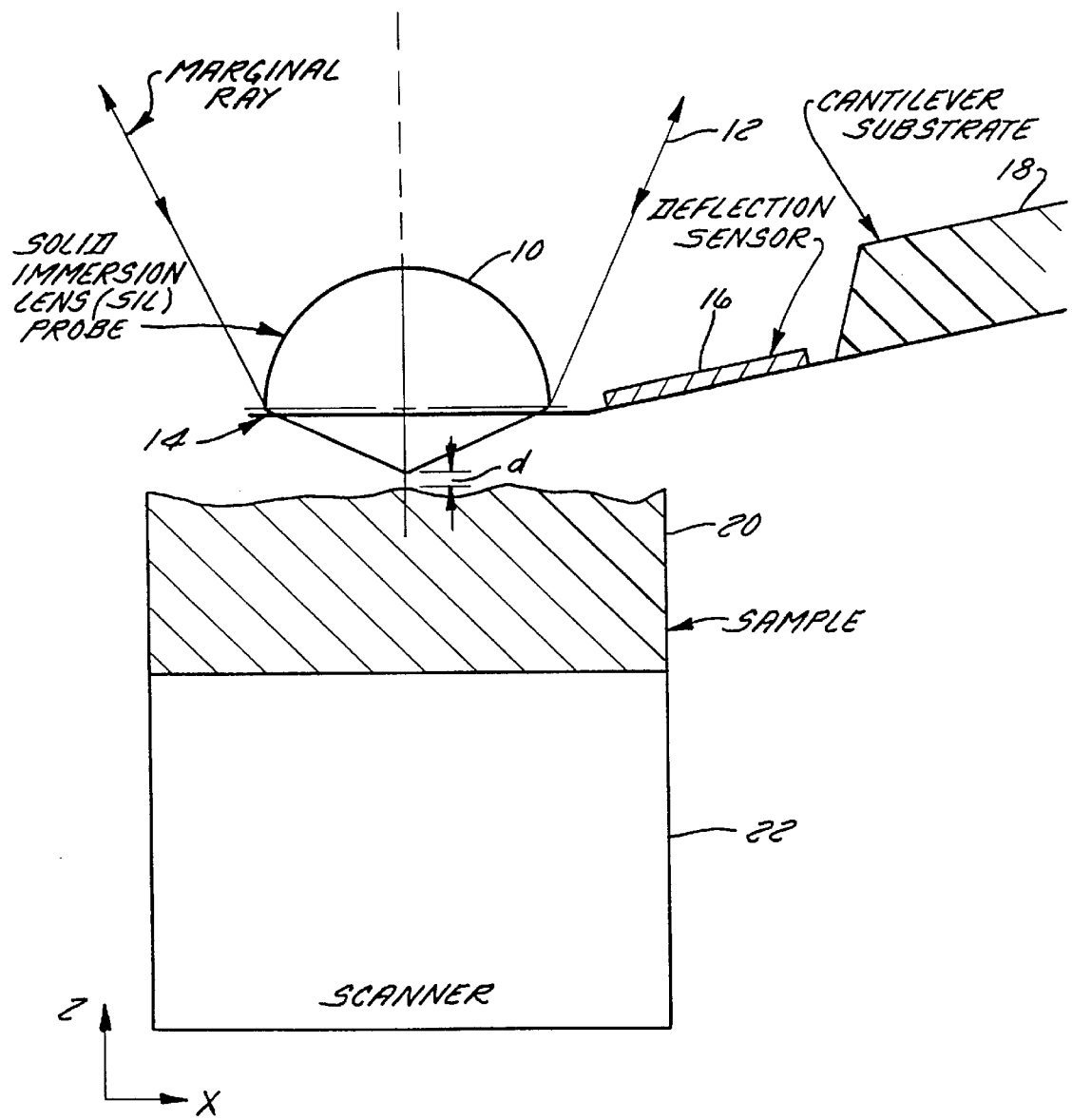
FIG. 1A is a side view of the solid immersion lens (SIL) probe with sharp tip on a cantilever showing the marginal ray, the sample, the scanner and the deflection sensor.

FIG. 1A shows a SIL probe 10 having a sharp tip mounted to a cantilever 14 and including a cantilever deflection sensor 16. The probe has a spherical surface and a conical or pyramidal surface with a sharp tip. The incident marginal rays 12 of the cone of illumination come to a focus near the tip of the SIL probe 10. A flexible cantilever 14, free on one end and attached to a cantilever substrate 18 on the other end, carries the SIL probe. The cantilever 14 allows for precise positioning of the probe tip near the sample surface. An XYZ scanner 22 carrying the sample 20 moves relative to the SIL probe 10 to generate data as a function of the XY position.

The Solid Immersion Lens (SIL) Probe

The SIL probe 10 of the preferred embodiment has a hemispherical upper surface for focusing the incident light with minimum aberration. The diameter of the sphere is typically in the range from 10 $\mu$m to 10 mm. The resolution limit depends on the accuracy of the spherical surface. Deviations from the perfect spherical shape produce a distortion of the wavefront inside the SIL probe and increase the spot size. The sphericity of the spherical surface (defined as the root-mean-square (rms) deviation from the perfect sphere) must be a small fraction of a wavelength. In addition the surface quality (roughness) must be controlled to minimize light scattering. Further, an antireflection (AR) coating may be applied to the SIL probe surfaces to improve transmission efficiency.

The angle of the marginal ray 12 also determines the optical resolution limit. The marginal ray 12 is defined as the ray at the edge of the cone of illumination having the maximum angle of incidence. A conventional microscope objective lens 30 focuses incident light to produce a cone of illumination that enters the SIL probe 10. Refraction at the spherical surface increases the angle of the marginal ray 12, and thus also increases the numerical aperture.

The SIL probe 10 has a sharp tip that can be conical or faceted (with three or more sides), or any other shape which provides a usable probe tip and doesn't interrupt the path of the marginal rays 12. For a SIL probe 10 with a conical tip, the angle of the marginal ray 12 determines the maximum apex angle of the conical surface. To achieve the smallest spot size, the height of the cone must be r/n, where r is the radius of the sphere and n the refractive index of the SIL probe material. Thus the apex angle of the conical surface is given by:

$$\theta = 2\tan^{-1}(n)$$

The radius of curvature of the tip of the SIL of the preferred embodiment is typically smaller than the spot size of the focused beam and may be as sharp as the probes used for atomic force microscopy (down to atomic dimensions). For optical imaging, the tip of the SIL probe 10 is in contact or separated by a small distance from the sample surface.

The SIL probe material preferably has a high refractive index and low absorption over a broad range of wavelengths, and especially at short wavelengths. Examples include Cubic Zirconia with a refractive index 2.17 and a short-wavelength cutoff at 380 nm. High index glasses are available, for example, SF6, with a refractive index of 1.805 and a cutoff at 370 nm. Also Gallium Phosphide, with a refractive index 3.5 and a cutoff at 550 nm.

Mechanical properties such as hardness and ability to take a polish are also important. Conventional grinding and polishing techniques can produce nearly perfect spheres with diameters down to approximately 0.5 mm out of materials with a hardness of about 7 on the mho scale. Another approach is to microfabricate SIL, probes on a wafer. Batch processing techniques, for example. photoresist reflow followed by reactive ion etching can produce arrays of spherical lenses on the wafer surface. After producing a spherical surface, high precision faceting machines can generate a conical, pyramidal or similar surface with a sharp tip.

Although the SIL probe 10 of the preferred embodiment is a super-hemispheric shape having a hemispheric upper surface and a pointed tip formed at the aplanatic surface 84 located below the equator of the sphere, other embodiments are possible. For example, upper surface may be aspheric to optimize the focusing of an astigmatic beam from, for example, a laser diode 38. The upper surface may include an optical filter over an area to filter out or block certain rays entering the lens. This provides control of the radiative power of the incident beam while preserving the evanescent power. The focus may be at another aplanatic surface 84, such as the equator of the sphere.

It is the intent of the applicant that the present invention include all variations in design of the SIL probe 10 that have the common features of focusing light to a small spot the use of a probe tip that is sufficiently sharp to permit operation as an AFM probe.

Cantilever

In the preferred embodiment, a cantilever 14 fixed to a cantilever substrate 18 at one end positions and orients the SIL probe 10. A stiff spring with a high resonance frequency permits surface tracking at rapid scan rates. However, the cantilever 14 spring constant must be soft enough to avoid tip and sample damage. The cantilever 14 can be made of metal such as stainless steel or dielectric such as silicon or silicon nitride. The length, width, thickness are determined by the diameter of the SIL probe and the desired spring constant and resonance frequency. The cantilever 14 can be configured as a single-beam, V-frame, balance beam, or any of the other cantilever configurations known in the art.

Scanner

In the preferred embodiment a scanner moves sample 20 in XYZ relative to the SIL probe 10. The scanner may be a piezo-tube with multiple electrodes patterned to produce XYZ motion with an appropriate applied voltage 50. The sample 20 can be transparent or reflecting, and the only restrictions on sample thickness or size (diameter) are due to the design of the cantilever substrate holder 28.

The scanner may also be a flexure stage driven by piezo-electric stacks and may include sensors (capacitive, LVDT, etc.) to provide closed-loop feedback control of the scan. Such scanners are available, for example, from Physik Instrument in Germany.

Figure 1B:
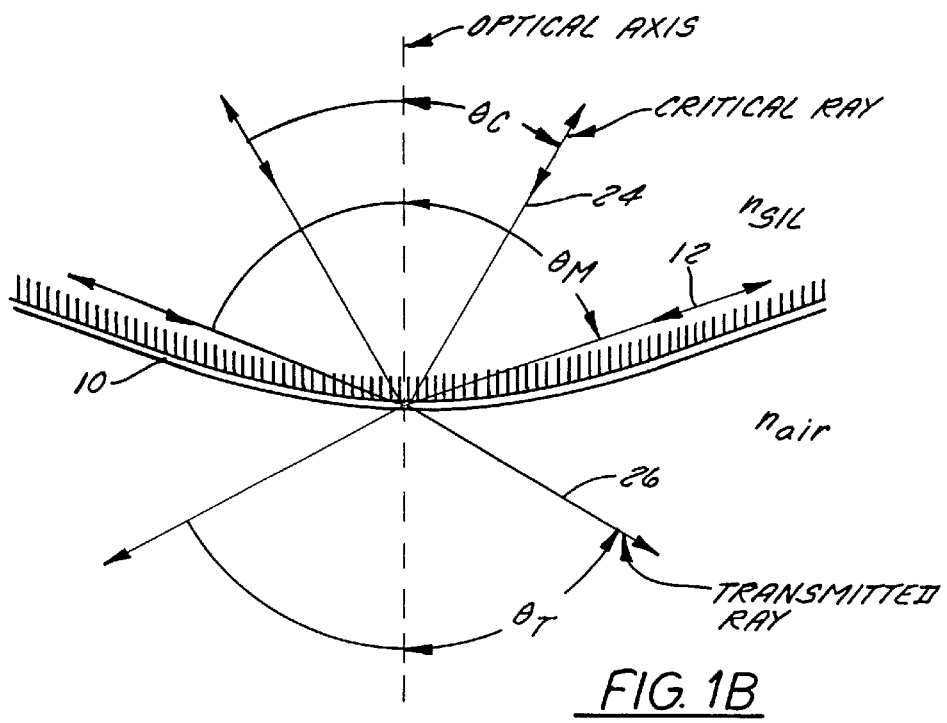
FIG. 1B is a ray diagram with the critical rays, the marginal rays and the transmitted rays at the SIL-air interface.

FIG. 1B Shows rays at the interface near the tip of the SIL probe 10, A cone of illumination comes to a focus near the interface between the high refractive index SIL probe 10 and the air or the sample 20. The incident cone includes an axial ray traveling along the optic axis, a critical ray 24, and a marginal ray 12 at the maximum angle of incidence. Rays incident at angles below the critical angle, theta sub C, reflect and refract at the interface to produce reflected and transmitted rays 26. Rays incident at angles above the critical angle are totally internally reflected to produce reflected rays and an evanescent wave. The depth of focus is given by:

$$2\Delta z \sim \lambda/(4n\ \sin^2(\Theta/2)). \qquad [3]$$

For cubic zirconia the depth of focus of the near-field spot inside the SIL probe 10 is approximately lambda/2.5. The depth of focus of the far-field diverging beam is approximately 2 lambda.

The amplitude of the evanescent wave decays exponentially with distance from the interface. The 1/e decay length of the evanescent wave is given by:

$$d_p = \frac{\lambda_1}{2\pi(\sin\theta^2 - n_{21}^2)^{1/2}} \qquad [4]$$

Where wavelength $\lambda_1 = \lambda_1$ and $n_{21} = n_2/n_1 = n_{air}/n_{SIL}$ and theta is the angle of incidence. The marginal ray 12 decay length is approximately $\lambda/10$. Thus the incident focused beam produces a near-field evanescent wave and a far-field diverging beam.

Figure 2:
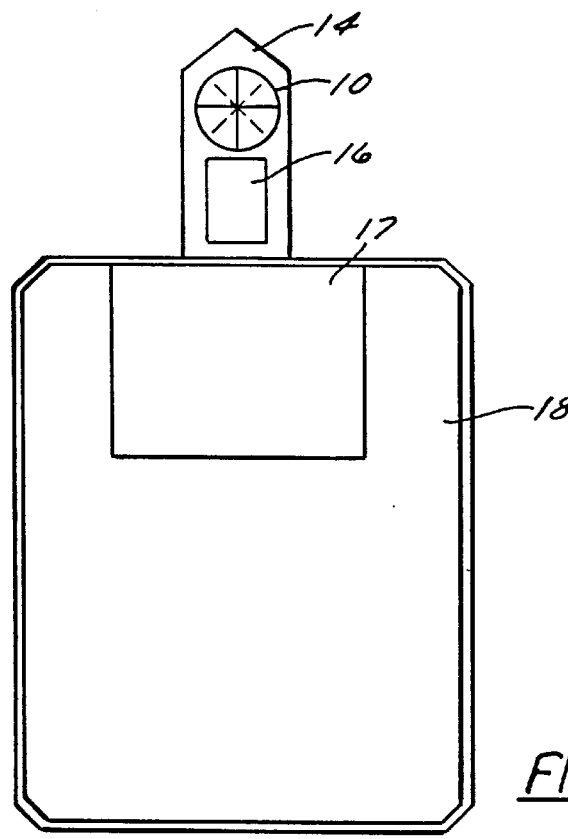
FIG. 2 is a top view of the solid immersion lens and cantilever with deflection sensor and substrate.

FIG. 2 Shows a SIL probe 10 mounted near the end of the cantilever 14 with a deflection sensor 16 and deflection sensor electrode 17 integrated onto the cantilever 14. The cantilever 14 has a cantilever substrate 18 to permit convenient handling. The cantilever substrate 18 is typically similar in size to the substrate for standard AFM tips. The SIL, probe 10 can be mounted manually in a slightly undersize hole near the free end of the cantilever 14 and may be glued in place. Alternatively, the SIL probe 10 and cantilever 14 may be batch fabricated as a single piece using microfabriation techniques, in which case there is no assembly required and lower cost.

Cantilever deflection sensors are well known in the prior art. Typical sensing means include including strain gauges, piezo-resistor strain gauge elements, PZT thin films, optical interferometers and the optical lever. The cantilever 14 or the SIL may have a reflective coating to optimize performance of the optical deflection sensors. Although the preferred embodiment of the solid immersion lens microscope utilizes an optical lever to sense cantilever deflection, it is the intent of the applicant that the invention include use of any of the cantilever deflection sensors known in the art, such as interferometric sensing, capacitive sensing, strain gauge sensing, and piezoelectric sensing.

Optical Train

Figure 3A:
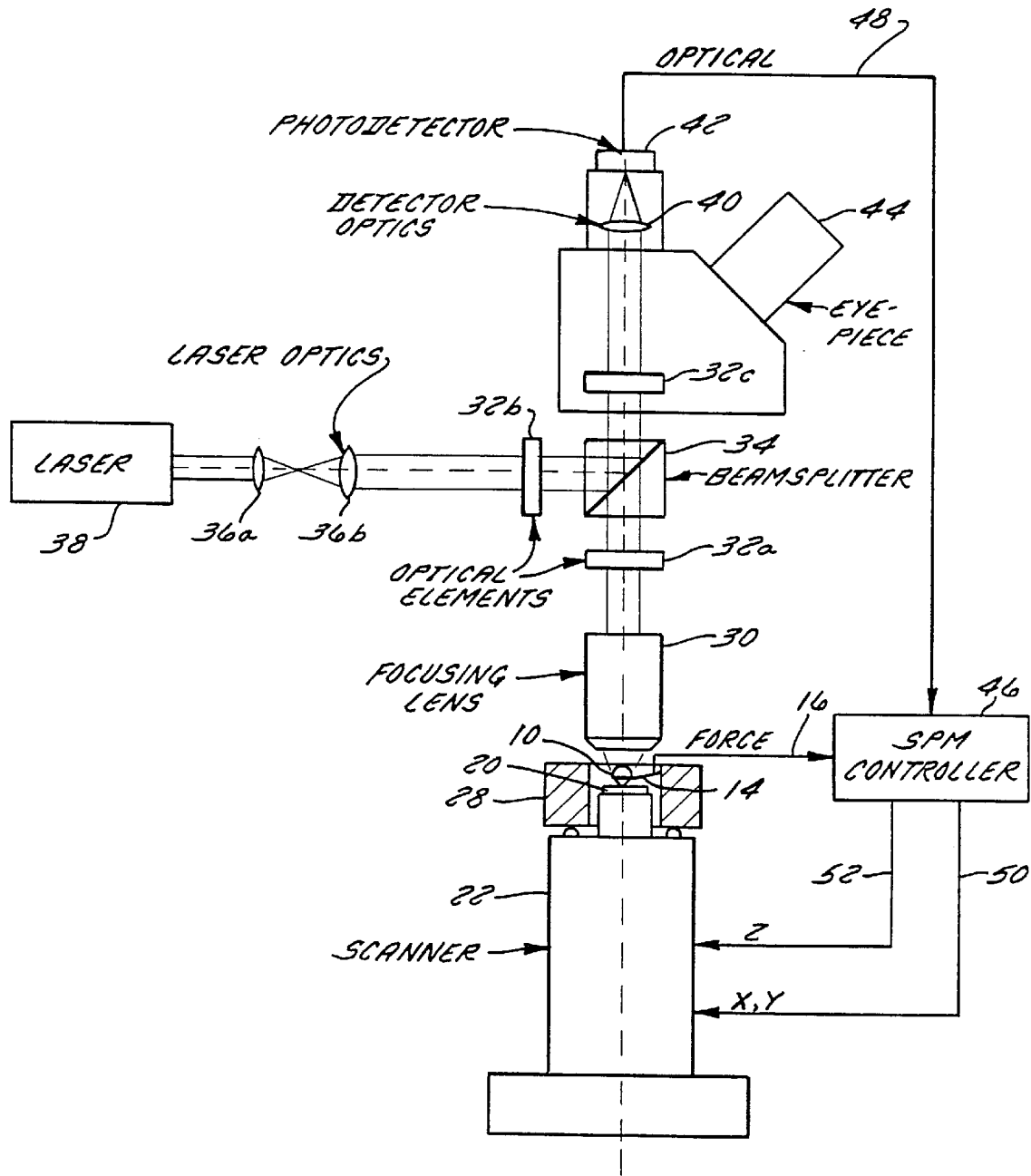
FIG. 3A shows the scanning probe microscope optical train with the laser, beam-splitter and detector integrated onto the microscope.

FIG. 3A shows one embodiment of the scanning-probe microscope optical train. The microscope includes a laser 38 and photodetector 42 mounted to a conventional upright microscope. A sample scanner carries the SIL probe 10 and cantilever substrate holder 28. A scanning probe microscope (SPM) controller 46 drives XY scanning motion, controls the sample height (Z) using as input the signal from the cantilever deflection sensor 16, and records the optical signal 48 from the photodetector 42.

The laser source 38 has a (preferably) short wavelength with sufficient power to permit reasonable scan rates, may be continuous or pulsed and has low intensity noise and good pointing stability. High quality collimation optics 36 provide a collimated beam with a diameter optimized for the selected focusing lens 30. A mask in the collimated beam can modify the intensity profile to provide annular illumination. The wavefront error of the collimated beam must be minimized to achieve the smallest possible spot size. A beam splitter 34, such as a cube or pellicle, reflects the laser beam into the focusing lens 30. The beam splitter 34 may simply split the power 50—50, may be polarizing, or dichroic (have a wavelength dependence). Reflected light can return through the beam-splitter to the photodetector 42.

A limiting aperture in front of the photodetector 42 may be used to reduce stray, background and out-of-focal plane light. A low light level detector (photon counting) is necessary for some applications and a focusing lens may focus light onto the detector active area. Filters 32 (*a,b,c*) for fluorescence, photoluminescence, polarization, intensity profile, phase control etc. can be added to implement other optical contrast mechanisms. For example, a quarter-wave plate, a Wollaston prism and a polarizing beam-splitter can be combined to produce an interferometer capable of extremely sensitive measurements of the relative phase between a signal and reference wave (see, for example, U.S. Pat. No. 5,602,820).

The upright microscope has a microscope objective 30 preferably with a long working distance and high numerical aperture in air. The microscope objective 30 is capable of focusing with minimum spherical aberration. The material of the lenses ideally has high transmission at short wavelengths. A correction collar may be included for imaging through a coverslip. As another option, a single lens optimized for focusing on the optic axis (paraxial focus) may be used in place of the conventional microscope objective 30. High numerical aperture aspheric lenses are available which can produce a diffraction-limited paraxial focus. As yet another option, a reflecting objective (such as a Swarzchild objective) using mirrors rather than lenses for focusing may replace the conventional microscope objective 30. The advantages of reflecting objectives include high numerical aperture, long working distances, small absorption losses even at short wavelengths and zero chromatic aberration. The upright microscope includes eyepieces 44 for direct view of the sample 20 and for alignment of the optical elements.

A cantilever substrate holder 28 carries the SIL probe 10 and allows for coarse positioning of the probe near the sample surface by use of, for example, a stepper motor driving a screw with a fine-pitch thread. The cantilever substrate holder 28 can use a spring-loaded, magnetic element, vacuum, glue etc. to carry the cantilever substrate 18. An XYZ scanner carries the sample 20 and the SPM controller 46 drives a raster scan in X and Y, while controlling the tip-sample gap. The SPM controller 46 also monitors and records the photodetector signal 48.

The microscope optical train may include an interferometer with a signal wave and a reference wave. The signal wave measures the interaction of the SIL probe 10 and the sample 20, while the reference wave measures the rest of the optical train. The interferometer monitors the relative phase and amplitude of the signal and reference waves. The optical components necessary to implement the interferometer include: quarter-wave plates, Wollaston prisms, beam-splitters, and various standard polarization control components.

Figure 3B:
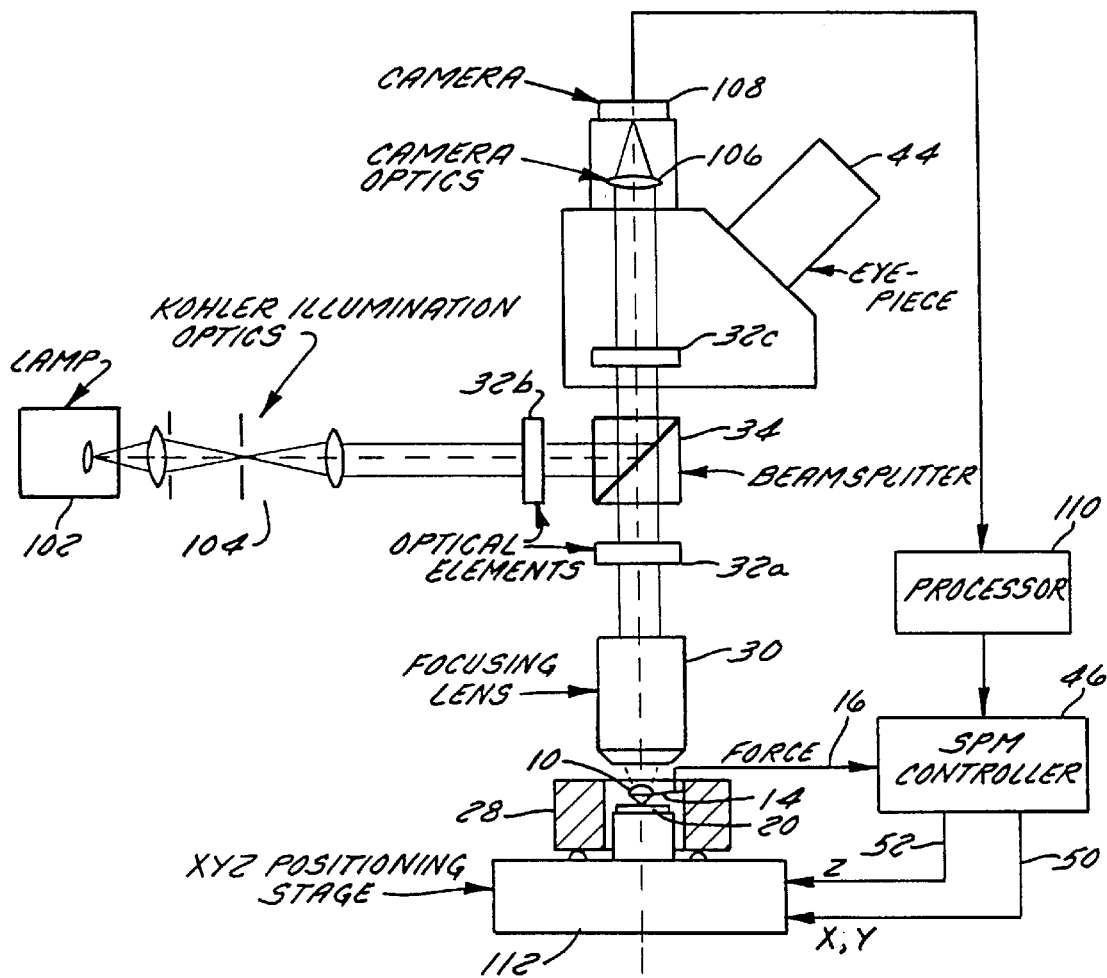
FIG. 3B shows the scanning probe microscope optical train with a lamp, beam-splitter and camera integrated onto the microscope.

FIG. 3B shows an alternate embodiment using a SIL probe designed for wide-field imaging. This embodiment includes a lamp 102 to replace the laser and a camera 108 to replace the photodetector on the upright microscope. A processor 110 monitors the camera signal and allows for a range of wide-field image processing functions. The SPM controller 46 includes a display for the processed images and controls the XYZ positioning stage 112 to select a field of view and control the tip-sample gap.

The preferred embodiment is a scanning probe microscope that generates images by scanning in a raster pattern and collecting data pixel-by-pixel. In this case the SIL probe has a sharp tip and focuses light to a small spot to illuminate a single pixel. The alternate embodiment is a wide-field imaging microscope that uses a SIL probe with a broad tip (having a large radius of curvature) to view a region of the sample and illuminate an array of pixels. The tip-sample contact area limits the field of view and the contact radius is given by:

$$r_c^2 \approx 2Rs$$

where $r_c$, is the contact radius, R is the tip radius, and s is the maximum tip-sample gap. For example, a 10 micron contact diameter requires 250 micron tip radius for a maximum tip-sample gap of 50 nm. Thus, the wide-field imaging microscope is best suited to flat, smooth samples.

The lamp 102 of the alternate embodiment is an incoherent source of illumination such as a Mercury arc or, tungsten halogen bulb. A Kohler illuminator 104 provides uniform illumination over the field-of-view and includes a field diaphragm to control the size of the field of view and an aperture diaphragm to control the illumination of the focusing lens. A color filter 32b can select a wavelength band of the illumination. The camera 108 is typically a CCD and the camera optics 106 determine the magnification of the image. A confocal microscope can replace of the conventional upright microscope to reduce background light from the spherical (upper) SIL surface and improve image contrast. In addition, the SIL probe may be AR coated to reduce reflected light.

Figure 4:
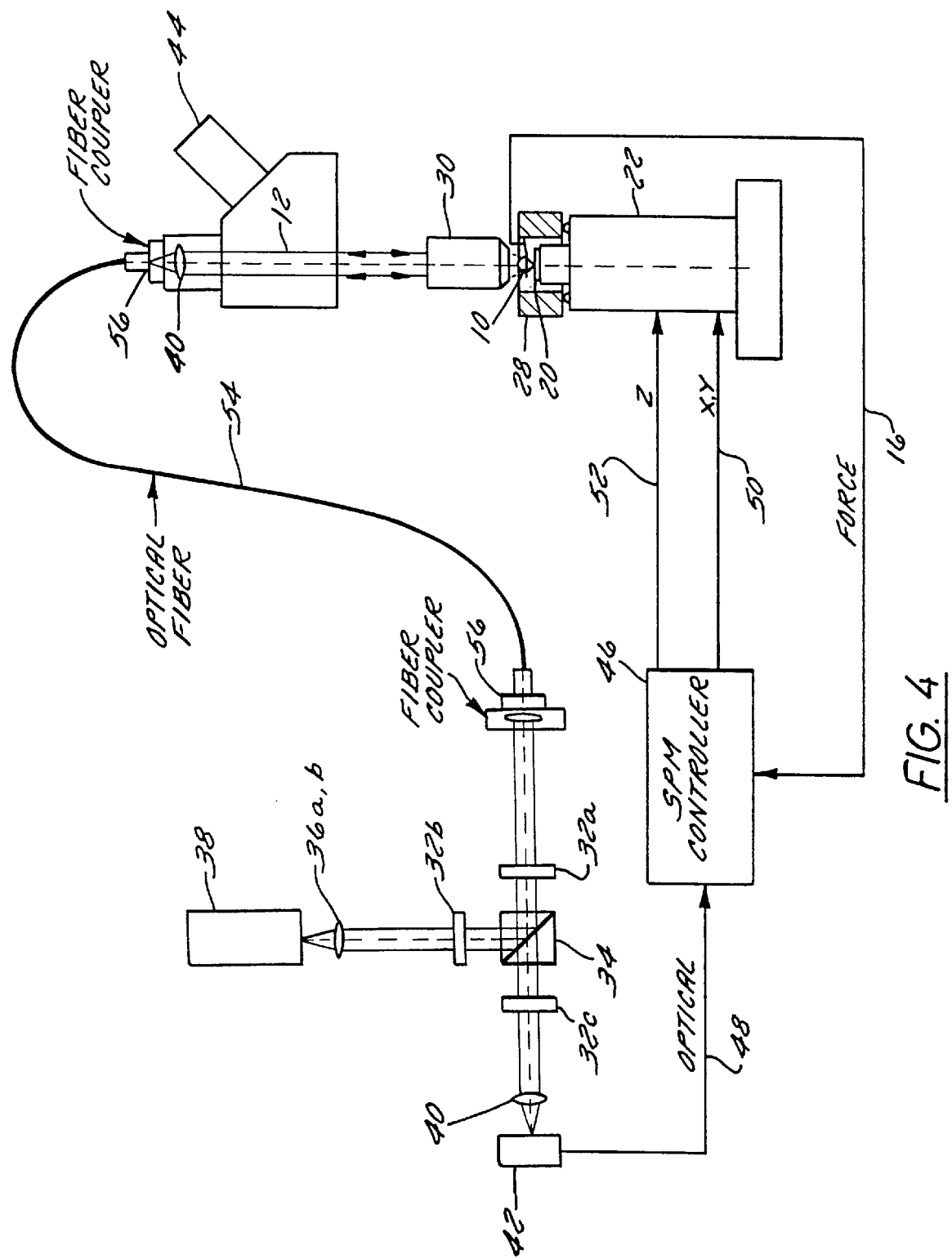
FIG. 4 shows the scanning probe microscope optical train, with a fiber to go from the laser, beam-splitter, and detector to the optical microscope.

FIG. 4 shows another embodiment of the near-field scanning probe microscope optical train. In this case, the laser optics 36 and sensor optics 40 connect to the upright microscope with a fiber coupler 56 to eliminate space constraints. The fiber coupler 56 includes a fiber collimator/coupler typically using single mode optical fiber 54 with a core diameter in the range 1–100 microns. The fiber couplers 56 require critical and sometimes painstaking alignment. It may be necessary to minimize back reflections that can cause intensity noise at the photodetector 42 by use of angle polished fiber connectors 56.

Figure 5:
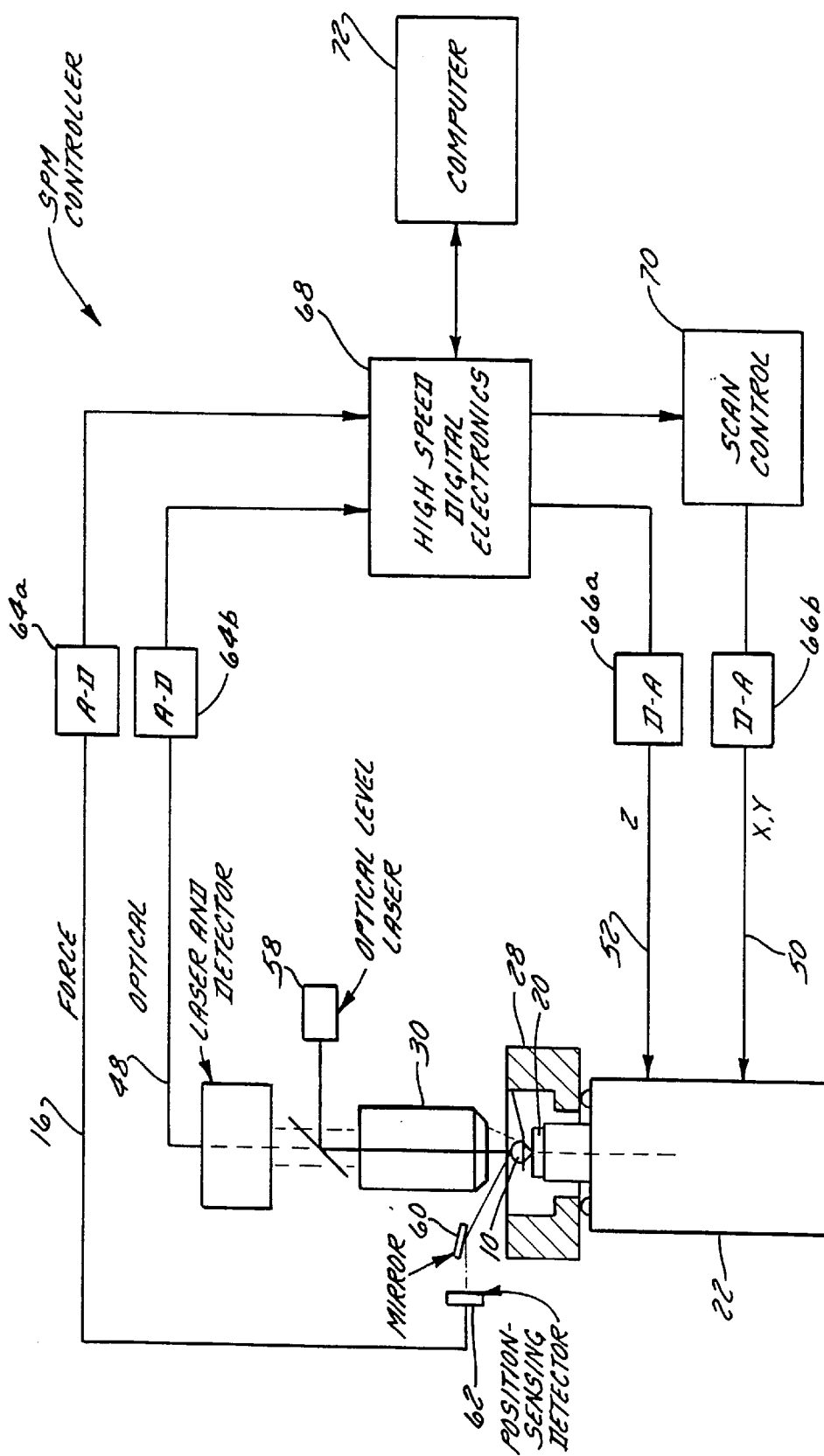
FIG. 5 shows the force-feedback loop for the cantilevered solid immersion lens.

FIG. 5 shows the force feedback loop for the SIL probe 10. In a preferred embodiment an optical lever deflection sensor monitors tip-sample forces and provides an input to the feedback loop 68, which can be analog or digital. The photodetector 42 also provides an input. An A–D (analog-to-digital converter 64) can sample the signal for the digital processor 68, or, direct digital input is possible from low light level photon counting (TTL) detectors.

The optical lever deflection sensor includes an optical beam incident on the cantilever 14, and reflected by a reflecting surface on the cantilever 14. An alignment mirror 60 directs the reflected beam to a position-sensitive photo-detector 62. An additional constraint not present in conventional atomic force microscopes is that the optical lever sensor must accommodate the working distance of the microscope objective 30. The best approach may be to direct the optical lever laser into the objective 30 in a direction nearly parallel to the optic axis. Then the reflected beam returns through the objective to the mirror 60 and position-sensing detector 62. In this way, it is possible to accommodate short working distance microscope objectives 30. A filter may be necessary to block the stray light of the optical lever laser 58 from reaching the SIL photodetector 42, or the wavelength of the optical lever beam 58 may be very different from the wavelength of the other light sources used in the microscope. In a preferred embodiment, the digital feedback loop uses an input A-D 64 from the deflection sensor 16, a high speed digital processor 68 for the feedback and an output D-A 66 to the Z axis actuator to complete the loop.

The scan controller 70 receives parameters to control the raster scan from the digital electronics 68 and generates a linear scan pattern which is output via D-As 66 to the XY scanner. A computer 72 controls the feedback loop and the raster scan, and records and displays the image data.

Figure 6A:
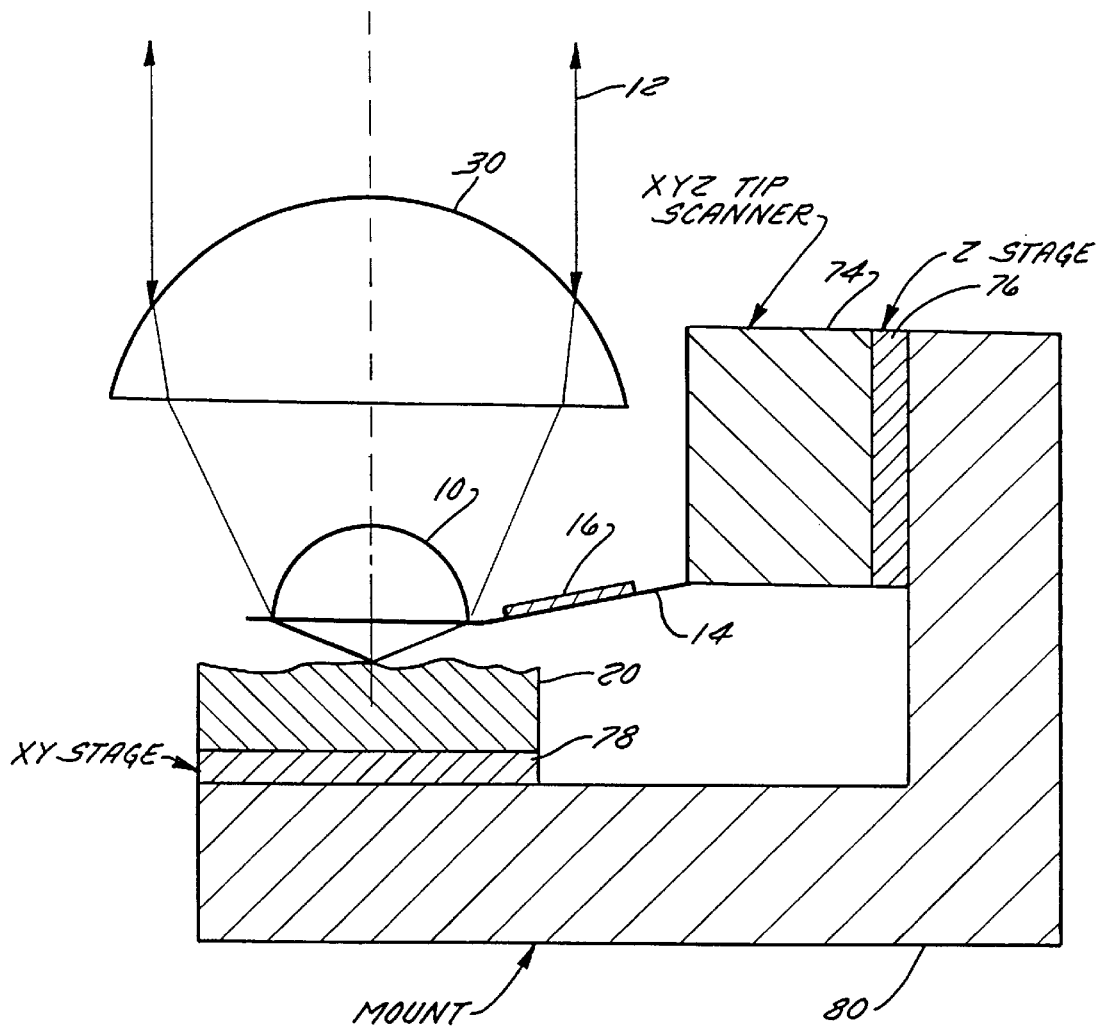
FIG. 6A shows the tip-scanning version of the solid immersion lens microscope.

FIG. 6a shows a tip-scanning version of the scanning probe microscope. An XYZ scanner 22 carries the cantilevered SIL probe 10 and moves the probe relative to the sample 20. A mount 80 carries the XYZ scanner 22 and the sample 20. The XYZ scanner 22 may also carry the intermediate focusing lens to keep the axis of the incident beam on the axis of the SIL probe 10 while scanning. The mount 80 also carries a coarse X-Y stage 78, and a Z-stage 76 to permit coarse approach of the SIL probe 10 to the sample surface. Since the sample 20 is stationary, the mount 80 can carry large samples 20 such as silicon wafers that may have diameters of 12". In addition, the mount 80 can accommodate a wide range of sample thickness (0.001"–10").

Figure 6B:
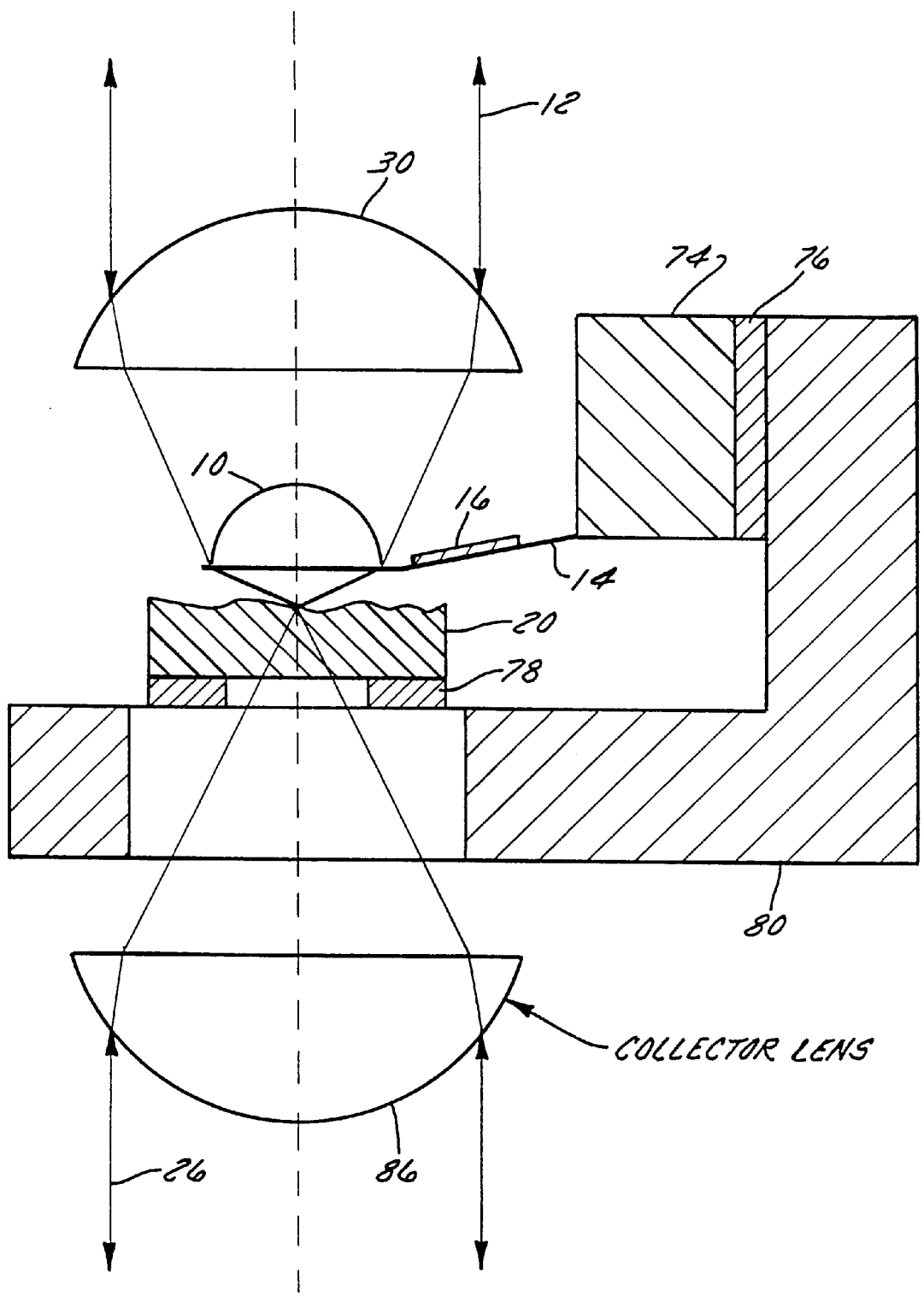
FIG. 6B shows the solid immersion lens microscope with a collection lens for transmitted light.

FIG. 6b shows a tip-scanning version of the scanning probe microscope designed for transparent samples. A collector lens 86 collects light transmitted to the sample and directs it to a photodetector 42.

Figure 7:
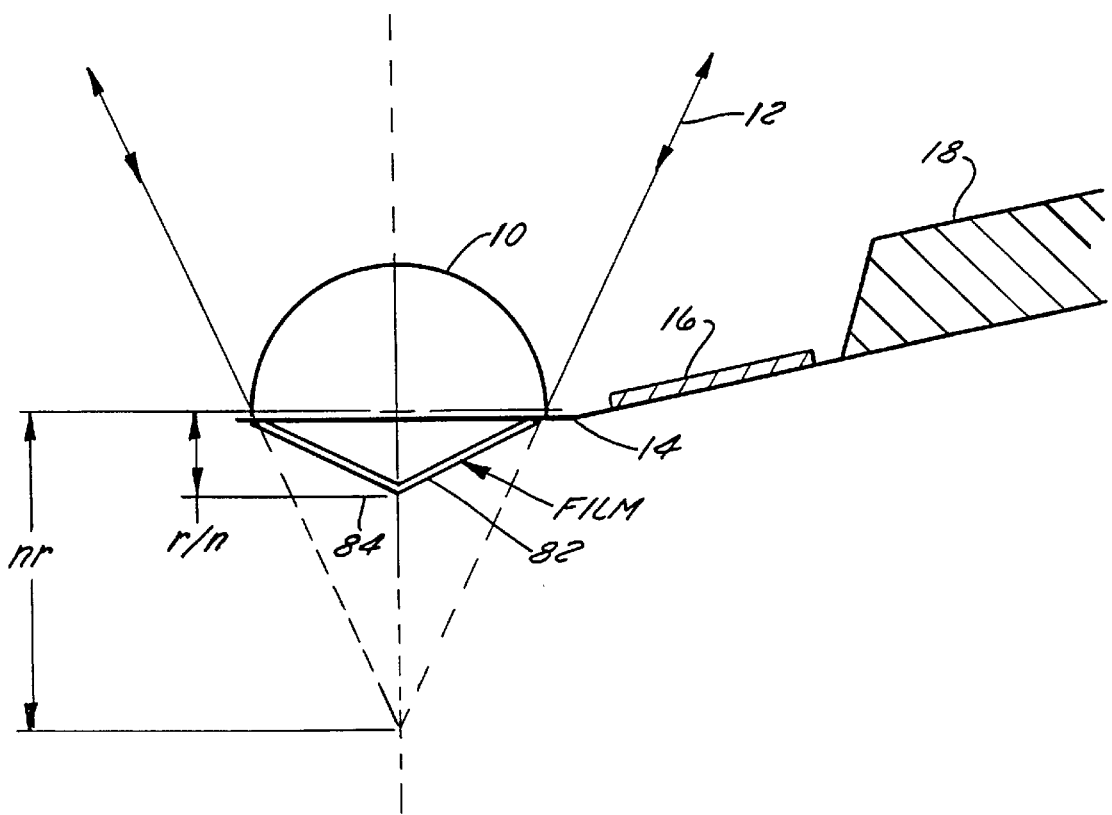
FIG. 7 shows the SIL probe with a (metallic or dielectric) thin film on bottom surface.

FIG. 7 shows a version of the SIL probe 10 with a layer of metallic or dielectric material on the conical or pyramidal (bottom) surface. While metallic coatings are a disadvantage for the tapered waveguide probe, there may be advantages for the SIL probe bottom surface. For example, grains in the film can scatter light with high efficiency and allow the detection of weak signals.

Optical properties such as refractive index and absorption determine with choice of layer material. A metallic thin film coating 82, for example Au, Ag, Al etc., will have a grain size that determines the light scattering cross section and a thickness that controls the optical density, from partially transparent to opaque. It is also possible to produce an aperture, or pinhole, in the opaque coating 82 near the tip, with a diameter in the range: $0.01\lambda$–$10\lambda$. A dielectric coating 82, for example GaP, MgF, SF6, CaF etc., will have a refractive index and transparency (absorption) different from the SIL probe material.

The thickness of the coating 82 may be greater than the wavelength or less than the wavelength and in addition, can vary over the SIL probe surface. Multilayer coatings 82 can also be useful. Finally, the thin film adhesion to the SIL probe surface should be strong enough to avoid scraping off the film while scanning the sample 20.

Operation of the Present Invention

In FIG. 1A and 1B a focused laser beam is shown incident on the SIL probe 10. The laser source 38 typically operates at a single wavelength but it is also possible to use a band of wavelengths over a range where the SIL probe material has low absorption. The ideal incident beam has a converging spherical wavefront free of aberrations. Refraction at the spherical surface of the SIL probe 10 focuses the beam further and increases the numerical aperture (NA). The cone of illumination converges to a spot near the tip of the SIL probe 10 with a spot given by the Abbe limit:

$$d \sim \lambda/(2 n_{SIL} \sin\Theta_M) \qquad [5]$$

Thus, the SIL probe 10 reduces the spot size because refraction at the spherical surface increases the angle, theta sub M, of the marginal ray 12, and the high index material shortens the wavelength to lambda/$2n_{SIL}$. Therefore, it is possible to reduce the spot size by choosing a material with the highest possible refractive index that is also transparent at short wavelengths so that the ration lambda/$n_{SIL}$ is small.

The lateral optical resolution of the SIL probe 10 depends on the size of the tip-sample gap relative to the decay length of the evanescent wave, dp.

Near-field case: tip-sample gap<dp

When the tip-sample gap is less than dp, the spot size within the SIL probe material determines the lateral optical resolution. Within the SIL probe material, the entire cone of illumination contributes to the focusing. The TIR rays produce an evanescent wave that leaks out a small distance (dp~$\lambda$/10) from the tip. The sample 20 interacts with and perturbs the evanescent wave causing a change in some property of the incident light, such as the intensity, polarization, wavelength, phase, etc.

In an alternate embodiment for samples transparent at a selected wavelength, it is possible to characterize features below the sample surface with a SIL probe designed to focus through a layer of the sample. The SIL probe upper surface may be spherical or aspherical and can be selected to collect for aberrations due to the layer of the sample between the SIL probe tip and the focal plane. Also, the SIL probe tip-sample contact area must increase to accommodate the converging cone of illumination. The tip-sample gap must be less than dp over the entire area of illumination to efficiently transmit light into the sample. The SIL probe refractive index can match or differ from the index of the sample and the refractive index of the sample rather than the SIL probe determines the lateral resolution. In addition to focusing light into the bulk of a transparent sample, it is also possible to focus through a thin transparent layer to a reflective sample surface on, for example, a data storage disc.

Far-field case: tip-sample gap>dp

When the tip-sample gap is greater than dp, the far-field spot size outside the SIL probe 10 determines the lateral resolution. The transmitted beam is a diverging cone where the marginal ray 12 is the refracted critical ray 24 (FIG. 1B). Since the angle of the critical ray 24 satisfies the relation $$\sin\Theta_C = 1/n_{SIL}, \qquad [6]$$

the spot size outside the SIL probe 10 increases by a factor $$n_{SIL}^2 \sin\Theta_M. \qquad [7]$$

These rays can interact with the sample 20 to produce a far-field image with relatively poor lateral resolution.

Annular illumination

A spatial filter 32 (donut mask) that blocks the rays near the center of the laser beam can eliminate the transmitted rays 26 (rays with an angle of incidence less than the critical angle). This avoids the far-field case, and also improves the spot size by an additional factor of 1.3 to 1.6 (see Guerra et al., U.S. Pat. No. 4,681,451). The full NA of the lens is still available for light returning to the photodetector 42. Taking all of this into account, the ultimate resolution of a cubic zirconia SIL probe is theoretically better than approximately lambda/6, or approximately 60 nm at the cutoff wavelength.

Sharp tip

The sample surface may have a roughness greater than the decay length, dp, of the evanescent wave. In addition there may be contamination (such as dust, debris, particulates etc.) on the sample surface. Thus, in most cases it is impossible to maintain a tip-sample gap less than dp over the large contact area (approximately 100 um diameter) required by the SIL probes of the prior art. The sharp tip reduces the contact area and allows the SIL probe 10 to approach the sample surface close enough to keep the tip-sample gap less than dp on rough sample surfaces and even in the presence of contamination. The tip radius may be greater or less than the optical spot size, depending on the surface roughness and the degree of height tracking desired.

Aberrations

Optical aberrations due to any of the lenses, but especially from the microscope objective 30 and the spherical SIL probe surface, increase the spot size and reduce lateral resolution. The hemispherical surface must have a sphericity (a measure of the rms deviation from a perfect sphere) that is a small fraction of a wavelength. To minimize spherical aberration the incident light focuses onto an aplanatic surface 84; such surfaces are well known in the prior art. For a spherical lens there are two such surfaces, one is a plane through the equator, another is a plane offset from the equator by a distance r/n, where r is the radius and n the refractive index of the sphere. Focusing a beam with a microscope objective 30 to a distance nr from the equator (see FIG. 7) produces a spot at the tip of the SIL probe 10 corrected for spherical aberration. In addition to spherical aberration, there are other monochromatic aberrations: coma, astigmatism, field curvature and distortion. These off-axis aberrations are kept to a minimum by keeping tight tolerances on the separation between the apex of the cone and the axis of the spherical surface.

According to the Rayleigh quarter-wave criterion, the diffraction limit occurs when the optical path difference of the abberrated waves is less than $\lambda/4$. From this condition we calculate the tolerance on spherical aberration and find that the tolerance for the thickness of the SIL probe 10 is on the order of a few microns. Therefore, high-precision polishing tools are necessary to meet tight tolerances on the height of the cone and the total height of the SIL probe 10 (distance from the apex of the cone to the top spherical surface).

Optical efficiency

The optical efficiency of the SIL probe 10 is very high because the probe avoids the use of limiting apertures and light-absorbing reflection and light loss due to reflection and scattering upper surface and absorption by the SIL probe material. However, anti-reflection coatings, high-quality polishes producing a smooth surface finish, and the selection of a material with minimum absorption at the operating wavelengths minimizes these losses. Thus, typically much more than 50% of the light entering the SIL probe 10 arrives at the focus and contributes to the optical signal.

The Cantilever

A flexible cantilever 14 carries the SIL probe 10 to allow deflections (bending) in response to forces between the SIL probe tip and the sample 20. A sensor on the cantilever 14 monitors the bending and operates in a feedback loop to control tip-sample forces. Such sensors are well known in the prior art and typical technologies include: strain gauges, PZT thin films, optical interferometers, optical levers, tunneling tips, and inductive and capacitive sensors. The sensor permits precise control of the tip-sample forces to keep the tip-sample gap within the near-field of the tip and to prevent damage to the tip or the sample 20.

In place of, or in addition to the cantilever force-feedback, the near-field optical signal 48 may also permit control of the tip-sample gap. Although the far-field transmitted beam has a large depth of focus ($2\Delta z \sim 2\lambda$, for cubic zirconia), it is possible to eliminate transmitted rays 26 using annular illumination. Then, for an optically isotropic sample 20, the near-field signal strength provides a measure of the tip-sample gap.

The cantilever 14 may operate in all AFM modes, including: Contact Mode where the tip of the SIL probe 10 touches the sample surface as it scans; Non-contact mode (constant gap mode) where the tip-sample gap is kept close to dp without touching the surface; Tapping Mode where the cantilever 14 oscillates at its resonance frequency and touches the sample surface at or near the turning point of each cycle (the oscillation amplitude may be greater, or less than dp); and Lift Mode where the tip first tracks the sample surface and stores the height data, and then retraces the scan using the stored data but with a height offset. Contact mode cantilevers typically have a small spring constant, and a low resonance frequency. Tapping mode cantilevers typically have a high spring constant, and a high resonance frequency. Lift Mode can be implemented with both contact and tapping mode cantilevers.

Lift Mode also provides a means to separate the height and the optical data. The first scan records the height in an AFM mode, and a second scan retraces the surface using stored height data. It is possible to raise or lower the SIL to optimize the tip-sample gap, dp, and image optical properties without mixing in the height data. One can also in the Lift Mode have the tip follow just the gross features of the sample surface such as tilt or curvature, but not follow the fine features.

Other AFM modes known in prior art include: Constant height mode (deflection mode) where the tip-sample gap varies as the probe scans at a fixed height (the probe may hit the surface). Also, phase imaging, scanning capacitance microscopy (SCM), magnetic force microscopy (MFM), electric force microscopy (EFM), Nanoindentation, and imaging biological samples in fluids, in vacuum, at high and low temperatures.

In addition, allowing the SIL probe 10 to "fly" over the sample surface permits very high scan rates, much higher than possible with a conventional atomic force microscope. In this case the force-feedback does not track the surface details and the tip-sample gap varies. High scan rates are possible because the optical signal data rate limit is much higher than the cantilever 14 mechanical response time. Cantilever resonance frequencies are typically less than 1 MHz, but the modulation of light is possible out to at least 1 GHz.

The spring constant of the cantilever 14 and the mass of the SIL probe 10 are ideally chosen to get the highest possible mechanical resonance frequency. Then the SIL probe tip can track the sample surface even at high scan rates. The cantilever 14 also controls and maintains the orientation of the SIL probe 10 to keep its optic axis aligned with the rest of the microscope. A stage 78 kinematically mounted to the sample scanner supports the cantilever substrate 18 and permits coarse approach of the SIL probe 10 to the sample surface.

Conventional Optical Microscope

The scanning probe microscope is based on a conventional optical microscope. The beam from the laser source 38 enters high quality collimation optics 36 to provide control of the degree of collimation, the beam diameter and the beam profile. The collimated laser beam may pass through filters 32 at any point to control parameters such as intensity, polarization, wavelength, phase etc. A beamsplitter directs the laser beam into a focusing lens, typically a microscope objective 30. The SIL probe 10 then focuses the beam further to produce a small spot near the tip. The light returning from the sample retraces the path of the incident beam up to the beam-splitter and then goes to a photodetector 42.

The scanning-probe microscope (SPM) controller accepts the optical signal 48 as an input and composes an optical image. An intensity monitoring detector 42 composes an image pixel-by-pixel. The SPM controller 46 also generates drive voltages 50 and 52 to scan the sample 20 in X and Y, and control the sample height (Z) according to the input from the cantilever deflection sensor 16.

In an alternate embodiment providing wide-field imaging the light from an incoherent source (lamp 102) enters Kohler illumination optics 104 that control the illuminated area of the sample and the illumination of the objective aperture. The light may pass through filters 32 at any point to control parameters such as intensity, beam profile, polarization, wavelength, phase etc. A beam-splitter 34 directs the light into a focusing lens, typically a microscope objective 30. The SIL probe 10 then focuses the beam further to produce a small spot near the tip. The light returning from the sample retraces the path of the incident beam up to the beam-splitter and then goes to the camera optics 106 and camera 108.

A processor 110 monitors and records the wide-field image data to characterize optical properties of the sample. In addition the processor can collect a series of images and compose a mosaic to obtain a larger field of view. Further, the interference of light reflected from the SIL probe surface and light reflected from the sample can be processed to measure additional sample characteristics similar to the results of Cohen et al. U.S. Pat. Nos. 5,204,734 and 5,133,601. An XYZ positioning stage 112 positions the region of interest under the SIL probe and controls the size of the tip-sample gap.

Example

A SIL probe was made from a 1 mm diameter Cubic Zirconia sphere with a tolerance on the sphericity of ~125 nm (5 micro-inches, Grade 5) and a refractive index n=2.2. A conical tip was polished on the SIL probe with a half-angle of 65 degrees and a contact area of ~2 microns. The SIL probe was mounted to a cantilever and brought into contact with a test sample. The test sample was a latex projection pattern consisting of a monolayer of hexagonally close packed latex spheres deposited on a suitable substrate and used as a mask for physical vapor deposition. In particular, an Aluminum projection pattern of 0.45 micron diameter latex spheres has a minimum feature size of less than 100 nm.

A green laser at 532 nm illuminated the SIL probe through a conventional microscope objective (Nikon 50×0.45 NA long working distance) and the reflected light intensity was monitored by a photodiode. A Digital Instruments Nanoscope IIIa SPM controller raster scanned the sample and accepted the photodiode signal as an analog input. The measured lateral resolution on the test sample was ~150 nm, and the theoretical resolution limit is ~130 nm. Using a blue laser at 430 nm the theoretical resolution limit for the Cubic Zirconia SIL probe is ~110 nm. For comparison, a GaP (Gallium Phosphide) SIL probe having refractive index 3.5 at a wavelength of 550 nm (the cutoff wavelength for optical absorption) has a theoretical resolution limit of ~90 nm.

FIG. 4 Embodiment with a fiber coupler

Fiber coupling allows the use of massive, table-top lasers 38 because the laser 38 does not attach directly to the microscope. The laser 38 and photodetector 42 can both couple into the fiber 54 as shown in FIG. 4, or, the laser 38 can be fiber coupled and the photodetector 42 can operate in the mode of the preferred embodiment (FIG. 3).

When both laser 38 and photodetector 42 are fiber-coupled to single-mode fiber 54 the system operates as a confocal microscope. The core of the fiber 54 acts as a spatial filter to reject out-of-focus light and reduce the depth of focus. This also reduces signal from radiative (not evanescent) light transmitted by the SIL probe 10, and the background signal from reflections off the SIL probe spherical surface.

FIG. 5 Feedback System

The feedback system of the preferred embodiment is a digitally calculated feedback system as described by Elings (U.S. Pat. No. RE 34,331). The system utilizes a three-dimensional piezoelectric scanner and a force sensor of a contact type with a tip mounted on a cantilever 14 and a sensor to detect the deflection of the lever at the tip. The signal from the sensor goes to an A–D converter and is then processed by high-speed digital electronics 68 to control the vertical motion of the sample 20 or sensor. In operation, the digital electronics 68 raise and lower the piezoelectric scanner during the scan to maintain the force of the tip on the sample 20 essentially constant.

FIG. 6 Tip Scanner

In an alternate embodiment, an XYZ scanner 22 carries the cantilever substrate 18 and moves the tip rather than the sample 20. Stationary stages 76, 78 attach to both the XYZ scanner 22 and the sample 20 via translation mechanisms that permit coarse positioning. The XYZ scanner 22 can also carry the focusing lens in order to keep the laser beam on the axis of the SIL probe 10 as the tip scans. The primary benefit of the tip scanner 74 is the ability to scan large samples 20 such as silicon wafers that may have diameters of 12".

FIG. 7 Thin Film on the SIL Probe

Thin metallic films can scatter light with high efficiency and improve the detection of weak signals. A strong scattering from small metallic grains may provide optical contrast over an area determined by the grain size rather than the wavelength of the illumination. In this way it may be possible to provide optical imaging with extremely high lateral resolution, down to the nanometer level.

The SIL probe 10 can significantly improve the performance of the prior art aperture less near-field optical microscopes. Coating the SIL probe bottom surface with a light scattering material having a nanometer-level grain size, or attaching a small particle to the tip of the SIL probe 10 provides an improved aperture less near-field microscope with a stronger signal level and reduced background level.

Integrating the coated SIL probe 10 with an interferometer provides for sensitive detection of the light scattering signal. A signal wave from the tip-sample interaction and a reference wave from a reference surface can interfere. The phase and amplitude of the interference signal measure the tip-sample interaction. The background from the shank of the AFM tip and the lever of the prior art microscopes is eliminated. Further, the evanescent field and the small spot size reduce background scattering from the sample 20. Thus, more of the scattered light returning to the photodetector 42 is useful signal. Dithering the SIL probe 10 and detecting the optical signal 48 at the dither frequency can also improve the signal. For example, dithering by driving the cantilever 14 at a resonance frequency is easy to implement. Lock-in detection using the resonance frequency as a reference can significantly improve the signal-to-noise ratio. Finally, the use of reflected light allows imaging of both transparent and opaque samples 20.

Surface Plasmon resonance imaging is also possible with a thin metallic film on the SIL probe bottom surface. Surface plasmons are extremely sensitive to the surface properties, down to the monolayer level. Some of the rays in the cone of light illuminating the SIL probe excite a plasmon resonance near the probe tip. By monitoring the intensity of the rays at the angle of the plasmon resonance as the SIL probe 10 scans over the sample surface, it is possible to detect extremely small changes in surface properties.

When the SIL probe 10 collects light, a thin opaque film covering the bottom surface except for a small region near the tip can eliminate background and stray light. This is similar to the use of an opaque coating with an aperture on conventional tapered fiber near-field probes.

As an alternative to the metallic film, a high refractive index dielectric film may also reduce the spot size in the SIL and improve the lateral resolution by shortening the wavelength.

In Summary

The theory of operation of the SIL probe 10 is fundamentally different from the tapered waveguide probe. Tapered optical waveguides attempt to confine light and force it through a limiting aperture much smaller than the wavelength. The disadvantages of this approach include extremely low light levels and mechanically fragile probes. Instead, the SIL probe 10 focuses light at a spherical surface and uses a high refractive index material to shorten the wavelength. In effect, the SIL probe 10 increases the numerical aperture of the conventional microscope objective 30. Thus, the SIL probe microscope provides substantially higher lateral resolution than conventional optical microscopes, and much higher light throughput than the tapered waveguide probe.

A sharp tip on the SIL probe 10 allows it to approach the sample surface to within the evanescent wave decay length even on rough sample surfaces, and even in the presence of contamination such as dust, debris, and particulates. A robust force-feedback mechanism permits precise control of the tip-sample separation. In addition, by allowing the SIL probe 10 to "fly" over the sample surface it is possible to scan at rates much higher than possible with an atomic force microscope. Thus, the SIL probe microscope combines the advantages of an atomic force microscope with the wide range of contrast mechanisms available in optical microscopy.

Although the preceding description of the preferred and alternate embodiments disclose specific implementations of the elements of the invention, it is the intent of the applicant that the invention include alternative implementations known in the art that perform the same functions as those disclosed.

The corresponding structures, materials, acts, and equivalents of all means or step plus function elements in the claims below are intended to include any structure, material, or acts for performing the functions in combination with other claimed elements as specifically claimed.

What is claimed is:

1. A scanning probe optical microscope comprising
 a) a sample support;
 b) a solid immersion lens of a high index of refraction material, said solid immersion lens having a first surface and a second surface, with said second surface forming a probe tip; the high index of refraction of the material establishing a critical angle, such that
  1) a light ray within the material and incident to a surface at an angle less than the critical angle is reflected and refracted at the surface, and
  2) a light ray within the material and incident to a surface at an angle greater than the critical angle is totally internally reflected to produce a reflected ray and an evanescent wave;
 c) optical means for focusing light through the first surface of the solid immersion lens to a focal spot at the probe tip on the second surface of the solid immersion lens;
 d) a vertical positioner to control the distance of the probe tip on the solid immersion lens from the sample having a surface to be scanned;
 e) a scanner for translating the solid immersion lens and the sample support relative to one another along a substantially horizontal plane; and
 f) optical means for collecting the light emerging from the upper surface of the solid immersion lens.

2. The scanning probe optical microscope of claim 1, wherein
 a) the probe tip on the second surface of the solid immersion lens forms a point; and
 b) the optical means for focusing light through the first surface of the solid immersion lens focuses light such that some light within the solid immersion lens impinges on the probe tip at an angle greater than the critical angle, creating an evanescent field adjacent to the probe tip;
whereby light supplied to the microscope creates a small spot of light adjacent to the probe tip which may be positioned near the surface of both smooth and rough samples, and the light collected from the microscope may be detected and analyzed to measure optical characteristics of the sample and to create optical images with a resolution better than the diffraction limit in air.

3. The scanning probe optical microscope of claim 1, wherein
 the probe tip on the second surface of the solid immersion lens has a large radius of curvature.

4. The scanning probe optical microscope of claim 1, wherein
 a) the probe tip on the solid immersion lens is shaped to function as an atomic force microscope probe; and
 b) the vertical positioner and scanner further comprise atomic force microscope control and measurement means;
whereby the microscope may also function as an atomic force microscope.

5. The scanning probe optical microscope of claim 1, wherein
 a) the first surface of the solid immersion lens has a shape corresponding substantially to one hemisphere of a geometric sphere, and
 b) the probe tip on the second surface of solid immersion lens lies on an optical aplanatic surface of the geometric sphere;
whereby spherical aberration is minimized and the optical resolution of the microscope is improved.

6. The scanning probe optical microscope of claim 5, wherein the probe tip on the second surface of the solid immersion lens lies on an aplanatic surface located at a distance of r/n, with r being the radius of the lens and n being the index of refraction of the lens material, from the equatorial plane of the geometric sphere;
whereby the solid immersion lens is a superhemispheric lens and the optical resolution of the microscope is improved.

7. The scanning probe optical microscope of claim 1, further comprising at least one spatial filter such that light within the solid immersion lens and impinging on the probe tip at angles less than the critical angle at the probe tip is reduced or substantially eliminated;

whereby the evanescent spot size is reduced, the resolution of the microscope is improved, and the far-field contribution of light is reduced or eliminated.

8. The scanning probe optical microscope of claim 1, wherein the optical means for focusing the light through the first surface of the solid immersion lens and the optical means for collecting the light emerging from the first surface of the solid immersion lens both comprise a) a conventional optical microscope objective lens positioned above the solid immersion lens; and b) an optical beam-splitter positioned above the conventional microscope objective lens, such that light from a source of illumination may be directed to the objective lens, and a portion of the light coming from the solid immersion lens through the objective lens may be separately directed to detection and analysis devices.

9. The scanning probe optical microscope of claim 8, further comprising a fiber optic cable between the optical microscope objective lens and the optical beam-splitter, such that light from the beam-splitter to the objective lens and light from the objective lens to the beam-splitter is transmitted through the fiber optic cable, whereby both a source of illumination and detection and analysis devices may be more conveniently located, thus allowing for greater flexibility in configuring the microscope, and the fiber optic cable may function as a spatial filter as in a confocal microscope, thus improving the resolution of the microscope.

10. The scanning probe optical microscope of claim 1, wherein the optical means for focusing the light through the first surface of the solid immersion lens and the optical means for collecting the light emerging from the first surface of the solid immersion lens both comprise an aspheric lens optimized for focusing on the optic axis, whereby the size and weight of the lens is less than the size and weight of a conventional microscope objective lens.

11. The scanning probe optical microscope of claim 1, wherein the optical means for focusing the light through the first surface of the solid immersion lens and the optical means for collecting the light emerging from the first surface of the solid immersion lens both comprise a confocal microscope.

12. The scanning probe optical microscope of claim 1, wherein the vertical positioner for controlling the distance of the probe tip relative to the sample comprises a) a cantilever onto which the solid immersion lens is mounted;

b) a cantilever deflection sensor; and c) a cantilever positioner;

whereby the deflection of the cantilever may be sensed and the position of the probe above the sample adjusted.

13. The scanning probe optical microscope of claim 12, wherein the cantilever deflection sensor further comprises a) a deflection sensor light source;

b) an optical signal combiner positioned above the optical means for focusing light through the first surface of the solid immersion lens, such that light from the deflection sensor light source is combined with light to be focused through the first surface of the solid immersion lens;

c) a reflective coating on a small area of the first surface of the solid immersion lens; and d) a deflection sensor light detector;

whereby light from the deflector sensor light source may be combined with the light for illuminating the sample, reflected off the upper surface of the solid immersion lens, and detected by the deflection sensor light detector to provide a measurement of cantilever deflection.

14. The scanning probe optical microscope of claim 1, wherein the horizontal positioner further comprises a conventional scanning probe microscope XYZ positioning system.

15. The scanning probe optical microscope of claim 1, further comprising a source of light.

16. The scanning probe optical microscope of claim 15, wherein the source of light is a laser.

17. The scanning probe optical microscope of claim 15, wherein the source of light is a laser and a fiber coupling, whereby the laser may be located remotely from the other components of the microscope, and the laser may be physically large.

18. The scanning probe optical microscope of claim 1 further comprising an optical sensor.

19. The scanning probe optical microscope of claim 18, wherein the optical sensor comprises a photodiode.

20. The scanning probe optical microscope of claim 18, wherein the optical sensor is a conventional optical microscope eyepiece or camera system and the microscope further comprises means for temporarily removing the solid immersion lens from the light path, whereby a sample my alternately be examined by conventional optical microscopy methods.

21. A optical microscope comprising a) an objective lens;

b) a beamsplitter above the objective lens, such that light for illuminating a sample may be directed from a source of illumination to the objective lens, and that a portion of the light emerging from the objective lens may be directed to light detection apparatus;

c) a solid immersion lens below the objective lens, said solid immersion lens having an upper surface and a lower surface, with said lower surface forming a probe tip, such that light from the objective lens is focused at the probe tip; and d) a vertical positioner for controlling the distance of the probe tip on the solid immersion lens from a sample;

whereby light from a source of illumination may be directed to a small spot on a sample, and the optical characteristics of a small area of sample may be determined.

22. The optical microscope of claim 21, wherein a) the probe tip on the lower surface of the solid immersion lens is shaped to function as an atomic force microscope probe; and b) the microscope further comprises atomic force microscope controller;

whereby both optical information and atomic force microscope measurements may be obtained from a sample without the need to align separate optical and atomic force measuring devices.

23. The optical microscope of claim 21, wherein the atomic force microscope controller further comprises a) means for recording the height of a sample;

b) means for positioning the probe tip to a precise distance above the sample based on the recorded height of the sample;

whereby near-field optical measurements may be made with the probe a known distance from the sample, allowing the effects of distance from sample and sample optical characteristics to be distinguished.

24. The optical microscope of claim 21, wherein the atomic force microscope controller further comprises a) means for making and recording atomic force microscope height measurements at many points on the surface of a sample;

b) means for repositioning the probe tip over the points for which atomic force height measurements were made, at a precise distance above each point, as calculated from the atomic force microscope measurements;

whereby near-field optical measurements may be made over a large area of a sample with the effects of distance from sample and sample optical characteristics distinguished.

25. The optical microscope of claim 21, further comprising a fiber optic cable between the objective lens and the beam-splitter, such that light from the beam-splitter to the objective lens and light from the objective lens to the beam-splitter is transmitted through the fiber optic cable whereby both a source of illumination and detection and analysis devices may be more conveniently located, thus allowing for greater flexibility in configuring the microscope, and the fiber optic cable may function as a spatial filter as in a confocal microscope, thus improving the resolution of the microscope.

26. A scanning probe optical microscope comprising
   a) a sample support;
   b) a solid immersion lens of a high index of refraction material, said solid immersion lens having a first surface and a second surface, with said second surface forming a probe tip; the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   c) optical means for focusing light through the first surface of the solid immersion lens to a focal spot at the probe tip on the second surface of the solid immersion lens;
   d) a vertical positioner for controlling the distance of the probe tip on the solid immersion lens relative to the sample;
   e) a scanner for translating the solid immersion lens and the sample support relative to one another along a substantially horizontal plane; and
   f) optical means for collecting light from the sample;
whereby the optical characteristics of translucent samples may be determined with a resolution better than the diffraction limit in air.

27. The scanning probe optical microscope of claim 26, wherein the optical means for focusing light through the first surface of the solid immersion lens focuses light such that some light within the solid immersion lens impinges on the probe tip at an angle greater than the critical angle, creating an evanescent field adjacent to the probe tip.

28. The scanning probe optical microscope of claim 26, wherein
   a) the probe tip on the solid immersion lens is shaped to function as an atomic force microscope probe; and
   b) the vertical positioner further comprises atomic force microscope control and measurement means;
whereby the microscope may also function as an atomic force microscope.

29. The scanning probe optical microscope of claim 26, wherein
   a) the first surface of the solid immersion lens has a shape corresponding substantially to one hemisphere of a geometric sphere; and
   b) the probe tip on the second surface of solid immersion lens lies on an optical aplanatic surface of the geometric sphere;
whereby spherical aberration is minimized and the optical resolution of the microscope is improved.

30. The scanning probe optical microscope of claim 29, wherein the probe tip on the second surface of the solid immersion lens lies on an aplanatic surface of the geometric sphere located at a distance of r/n, with r being the radius of the lens and n being the index of refraction of the lens material, from the equatorial plane of geometric sphere, whereby the solid immersion lens is a superhemispheric lens and the optical resolution of the microscope is improved.

31. The scanning probe optical microscope of claim 26, further comprising a spatial filter to selectively filter the light to be focused through the first surface of the solid immersion lens, such that light impinging on the probe at less than the critical angle is reduced or substantially eliminated,
whereby the evanescent spot size is reduced, the resolution of the microscope is improved, and the far-field contribution of light is reduced or eliminated.

32. The scanning probe optical microscope of claim 26, further comprising an opaque coating on a portion of the first surface of the solid immersion lens, such that light which would impinge on the probe tip at less than the critical angle is blocked,
whereby the evanescent spot size is reduced, the resolution of the microscope is improved, and the far-field contribution of light is reduced or eliminated.

33. The scanning probe optical microscope of claim 26, wherein the optical means for focusing the light through the first surface of the solid immersion lens comprises a conventional optical microscope objective lens positioned above the solid immersion lens.

34. The scanning probe optical microscope of claim 26, wherein the optical means for focusing the light through the first surface of the solid immersion lens and the optical means for collecting the light emerging from the first surface of the solid immersion lens both comprise an aspheric lens optimized for focusing on the optic axis,
whereby the size and weight of the lens is less than the size and weight of a conventional microscope objective lens.

35. The scanning probe optical microscope of claim 26, wherein the vertical positioner for controlling the distance of the probe tip relative to the sample comprises
   a) a cantilever onto which the solid immersion lens is mounted;
   b) a cantilever deflection sensor; and
   c) a cantilever positioner;
whereby the deflection of the cantilever may be sensed and the position of the probe above the sample adjusted.

36. The scanning probe optical microscope of claim 26, wherein the scanner for translating the solid immersion lens and the sample support relative to one another along a substantially horizontal plane comprises a conventional scanning probe microscope XYZ positioning system.

37. The scanning probe optical microscope of claim 26, wherein
   a) a portion of the sample support is transparent; and
   b) the optical means for collecting light from the sample further comprises optical light collection means located below the transparent support for the sample to be scanned;
whereby translucent samples may be examined with light transmitted through the sample.

38. The scanning probe optical microscope of claim 26, wherein the optical means for collecting light from the sample further comprises optical light collection means located above the sample, whereby samples may be examined with the light scattered from the surface of the sample.

39. The scanning probe optical microscope of claim 26 further comprising a source of light.

40. The scanning probe optical microscope of claim 26, wherein the source of light is a laser.

41. The scanning probe optical microscope of claim 40, wherein the source of light is a laser and a fiber coupling, whereby the laser may be located remotely from the other components of the microscope.

42. The scanning probe optical microscope of claim 26 further comprising an optical sensor.

43. The scanning probe optical microscope of claim 42, wherein the optical sensor comprises a photodiode.

44. A combined scanning probe optical microscope and atomic force microscope, comprising
   a) a cantilever having a base end and a distal end, said distal end equipped with a solid immersion lens having an upper surface and a lower surface, said lower surface forming an atomic force microscope probe tip;
   b) the solid immersion lens being formed of a high index of refraction material, the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   c) a position control mechanism for controlling the position of a sample with respect to the base end of the cantilever;
   d) a small-displacement measuring mechanism for measuring a deflection amount of the cantilever;
   e) a feedback control mechanism for fine control of the vertical position of the probe tip having as one input the deflection amount of the cantilever;
   f) means for recording vertical and horizontal position data of the probe tip;
   g) optical means for focusing light through the first surface of the solid immersion lens to a focal spot at the probe tip on the second surface of the solid immersion lens, such that some light within the solid immersion lens impinges on the probe tip at an angle greater than the critical angle, creating an evanescent field adjacent to the probe tip; and
   h) optical means for collecting the light emerging from the upper surface of the solid immersion lens;
whereby both atomic force and near-field optical information may be obtained about both smooth and rough samples, with the optical data providing a resolution better than the diffraction limit in air.

45. The combined scanning probe optical microscope and atomic force microscope of claim 44, wherein
   a) the first surface of the solid immersion lens has a shape corresponding substantially to one hemisphere of a geometric sphere; and
   b) the probe tip on the second surface of solid immersion lens lies on an optical aplanatic surface of the geometric sphere;
whereby spherical aberration is minimized and the optical resolution of the microscope is improved.

46. The combined scanning probe optical microscope and atomic force microscope of claim 44, wherein the probe tip on the second surface of the solid immersion lens lies on the aplanatic surface located at a distance of r/n, with r being the radius of the lens and n being the index of refraction of the lens material, from the equatorial plane of the lens, whereby the solid immersion lens is a superhemispheric lens and the optical resolution of the microscope is improved.

47. The combined scanning probe optical microscope and atomic force microscope of claim 44 further comprising one or more spatial filters to selectively filter light such that light impinging on the probe at less than the critical angle is reduced or substantially eliminated, whereby the evanescent spot size is reduced, the resolution of the microscope is improved, and the far-field contribution of light is reduced or eliminated.

48. The combined scanning probe optical microscope and atomic force microscope of claim 44, wherein the optical means for focusing the light through the first surface of the solid immersion lens comprises an aspheric lens optimized for focusing on the optic axis, whereby the size and weight of the lens is less than the size and weight of a conventional microscope objective lens.

49. The combined scanning probe optical microscope and atomic force microscope of claim 44, wherein the position control mechanism for controlling the position of a sample with respect to the base end of the cantilever and the means for recording vertical and horizontal position data of the probe tip further comprise scan control and scan recording means.

50. A combined scanning probe optical microscope and atomic force microscope, comprising
   a) a cantilever having a base end and a distal end, said distal end equipped with a solid immersion lens having an upper surface and a lower surface, said lower surface forming an atomic force microscope probe tip;
   b) the solid immersion lens being formed of a high index of refraction material, the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   c) a position control mechanism for controlling the position of a sample with respect to the base end of the cantilever;
   d) a small-displacement measuring mechanism for measuring a deflection amount of the cantilever;
   e) a feedback control mechanism for fine control of the vertical position of the probe tip having as one input the deflection amount of the cantilever;
   f) means for recording vertical and horizontal position data of the probe tip;
   g) optical means for focusing light through the first surface of the solid immersion lens to a focal spot at the probe tip on the second surface of the solid immersion lens, such that some light within the solid immersion lens impinges on the probe tip at an angle greater than the critical angle, creating an evanescent field adjacent to the probe tip; and
   h) optical means for collecting the light transmitted from the probe tip through a translucent sample;
whereby both atomic force and near-field optical information may be obtained about both smooth and rough translucent samples, with the optical data providing a resolution better than the diffraction limit in air.

51. The combined scanning probe optical microscope and atomic force microscope of claim 50, wherein
   a) the first surface of the solid immersion lens has a shape corresponding substantially to one hemisphere of a geometric sphere; and
   b) the probe tip on the second surface of solid immersion lens lies on an optical aplanatic surface of the geometric sphere;
whereby spherical aberration is minimized and the optical resolution of the microscope is improved.

52. The combined scanning probe optical microscope and atomic force microscope of claim 50, wherein the probe tip on the second surface of the solid immersion lens lies on an aplanatic surface of the geometric sphere located at a distance of r/n, with r being the radius of the lens and n being the index of refraction of the lens material, from the equatorial plane of the geometric sphere,
whereby the solid immersion lens is a superhemispheric lens and the optical resolution of the microscope is improved.

53. The combined scanning probe optical microscope and atomic force microscope of claim 50 further comprising one or more spatial filters to selectively filter light such that light impinging on the probe at less than the critical angle is reduced or substantially eliminated,
whereby the evanescent spot size is reduced, the resolution of the microscope is improved, and the far-field contribution of light is reduced or eliminated.

54. The combined scanning probe optical microscope and atomic force microscope of claim 50, wherein the optical means for focusing the light through the first surface of the solid immersion lens comprises an aspheric lens optimized for focusing on the optic axis,
whereby the size and weight of the lens is less than the size and weight of a conventional microscope objective lens.

55. The combined scanning probe optical microscope and atomic force microscope of claim 50, wherein the position control mechanism for controlling the position of a sample with respect to the base end of the cantilever and the means for recording vertical and horizontal position data of the probe tip further comprise scan control and scan recording means.

56. A method of illuminating a small spot on a smooth or rough sample comprising
   a) positioning a solid immersion lens of a high index of refraction material having a first surface and second surface, said second surface forming a probe tip, within the near-field of a surface to be illuminated; the solid immersion lens being formed of a high index of refraction material, the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   b) focusing light through the first surface of the solid immersion lens to a focal spot at the probe tip on the second surface of the solid immersion lens, such that some light within the solid immersion lens impinges on the probe tip at an angle greater than the critical angle, creating an evanescent field adjacent to the probe tip,
whereby the sample near the tip is efficiently illuminated by the evanescent field at the probe tip.

57. The method of claim 56, wherein the first surface of the solid immersion lens positioned near the surface to be illuminated has a shape corresponding substantially to one hemisphere of a geometric sphere and the probe tip is formed on a geometric aplanatic surface of the geometric sphere,
whereby spherical aberration is eliminated and the spot size is minimized.

58. The method of claim 57, wherein the probe tip on the second surface of the solid immersion lens lies on an aplanatic surface of the geometric sphere located at a distance of r/n, with r being the radius of the lens and n being the index of refraction of the lens material, from the equatorial plane of the geometric sphere,
whereby the solid immersion lens is a superhemispheric lens and the size of the illumination spot is further reduced.

59. The method of claim 56 further comprising the step of spatially filtering the light to be focused on the solid immersion lens to eliminate rays which would impinge the probe tip at less than the critical angle,
whereby the size of the illumination spot is further reduced and the contribution of far-field light is reduced or eliminated.

60. A method of measuring the optical characteristics of a small spot on a smooth or rough sample comprising
   a) positioning a solid immersion lens of a high index of refraction material having a first surface and second surface, said second surface forming a probe tip, within the near-field of a surface to be illuminated; the solid immersion lens being formed of a high index of refraction material, the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   b) focusing light through the first surface of the solid immersion lens to a focal spot at the probe tip on the second surface of the solid immersion lens, such that some light within the solid immersion lens impinges on the probe tip at an angle greater than the critical angle, creating an evanescent field adjacent to the probe tip;
   c) collecting the light emerging from the upper surface of the solid immersion lens;
   d) measuring characteristics of the collected light,
whereby the sample near the tip is efficiently illuminated by the evanescent field at the probe tip, and light is efficiently collected from the probe tip for measurement and analysis.

61. The method of claim 60, wherein the first surface of the solid immersion lens positioned near the surface to be illuminated has a shape corresponding substantially to one hemisphere of a geometric sphere, and the probe tip is formed on an aplanatic surface of the geometric sphere,
whereby spherical aberration is eliminated and the spot size is minimized.

62. The method of claim 61, wherein the probe tip on the second surface of the solid immersion lens lies on an aplanatic surface located at a distance of r/n, with r being the radius of the lens and n being the index of refraction of the lens material, from the equatorial plane of the geometric sphere,
whereby the solid immersion lens is a superhemispheric lens and the size of the illumination spot is further reduced.

63. The method of claim 60, further comprising the step of annularly filtering the light to be focused on the solid immersion lens to eliminate rays which would impinge the probe tip at less than the critical angle, whereby the size of the illumination spot is further reduced and the contribution of far-field light is reduced or eliminated.

64. A method of optical microscopy of a smooth or rough sample, comprising
   a) positioning a solid immersion lens of a high index of refraction material having a first surface and second surface, said second surface forming a probe tip, within the near-field of a surface to be illuminated; the solid immersion lens being formed of a high index of refraction material, the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   b) focusing light through the first surface of the solid immersion lens to a focal spot at the probe tip on the second surface of the solid immersion lens, such that some light within the solid immersion lens impinges on the probe tip at an angle greater than the critical angle, creating an evanescent field adjacent to the probe tip;
   c) collecting the light emerging from the upper surface of the solid immersion lens;
   d) measuring of the collected light;
   e) repeating steps a) through d) as the probe is scanned over the surface; and
   f) analyzing and assembling the collected data into an optical image,
whereby the sample near the tip is efficiently illuminated by the evanescent field at the probe tip, light is efficiently collected from the probe tip for measurement; and optical images of both smooth and rough samples at a resolution better than the diffraction limit in air may be obtained.

65. The method of claim 64, wherein the first surface of the solid immersion lens positioned near the surface to be illuminated has a shape corresponding substantially to one hemisphere of a geometric sphere, and the probe tip is formed on an aplanatic surface of the geometric sphere, whereby spherical aberration is eliminated and the spot size is minimized.

66. The method of claim 65, wherein the probe tip on the second surface of the solid immersion lens lies on the aplanatic surface located at a distance of r/n, with r being the radius of the lens and n being the index of refraction of the lens material, from the equatorial plane of the geometric sphere,
whereby the solid immersion lens is a superhemispheric lens and the size of the illumination spot is further reduced.

67. The method of claim 64, further comprising the step of spatially filtering the light to be focused on the solid immersion lens to eliminate rays which would impinge the probe tip at less than the critical angle,
whereby the size of the illumination spot is further reduced and the contribution of far-field light is reduced or eliminated.

68. A method of combined atomic force and optical microscopy of a smooth or rough sample, comprising
   a) performing an atomic force microscope (AFM) scan of a sample using a solid immersion lens of a high index of refraction material as an AFM probe, said solid immersion lens having a first surface and second surface, said second surface forming a probe tip; the solid immersion lens being formed of a high index of refraction material, the high index of refraction of the material establishing a critical angle, such that
      1) a light ray within the material and incident to a surface at an angle less than the critical angle is reflected and refracted at the surface, and
      2) a light ray within the material and incident to a surface at an angle greater than the critical angle is totally internally reflected to produce a reflected ray and an evanescent wave;
   b) storing the atomic force microscope scan information in a memory device, said scan information including height data Z corresponding to each X and Y location of the scan;
   c) calculating from the stored scan data a new height value Z' for each X and Y location of the scan, the new height value being a constant distance above the sample, and within the evanescent field of the sample;
   d) repositioning the probe on the second surface of the solid immersion lens to an X and Y location of the AFM scan, at the new height value Z';
   e) focusing light through the first surface of the solid immersion lens to a focal spot at the probe tip on the second surface of the solid immersion lens, such that some light within the solid immersion lens impinges on the probe tip at an angle greater than the critical angle, creating an evanescent field adjacent to the probe tip;
   f) collecting the light emerging from the upper surface of the solid immersion lens;
   g) measuring characteristics of the collected light;
   h) repeating steps d) through g) for each X and Y location of the scan; and
   i) analyzing and assembling the collected data into an optical image,
whereby the sample near the tip is efficiently illuminated by the evanescent field at the probe tip, light is efficiently collected from the probe tip for measurement; optical images of smooth or rough samples at a resolution better than the diffraction limit in air may be obtained; and the optical characteristics of the sample may be distinguished from the effects of probe-to-sample distance.

69. The method of claim 68, wherein the first surface of the solid immersion lens positioned near the surface to be illuminated has a shape corresponding substantially to one hemisphere of a geometric sphere, and the probe tip is formed on an aplanatic surface of the geometric sphere, whereby spherical aberration is eliminated and the spot size is minimized.

70. The method of claim 69, wherein the probe tip on the second surface of the solid immersion lens lies on an aplanatic surface of the geometric sphere located at a distance of r/n, with r being the radius of the lens and n being the index of refraction of the lens material, from the equatorial plane of the geometric sphere,
whereby the solid immersion lens is a superhemispheric lens and the size of the illumination spot is further reduced.

71. The method of claim 68, further comprising the step of annularly filtering the light to be focused on the solid immersion lens to eliminate rays which would impinge the probe tip at less than the critical angle,
whereby the size of the illumination spot is further reduced and the contribution of far-field light is reduced or eliminated.

* * * * *